(12) United States Patent
Nakazawa et al.

(10) Patent No.: US 11,769,930 B2
(45) Date of Patent: Sep. 26, 2023

(54) SEPARATOR INCLUDING ACTIVE LAYER HAVING LITHIUM-OCCLUDING MATERIAL, AND ELECTRICITY STORAGE DEVICE INCLUDING THE SAME

(71) Applicant: Asahi Kasei Kabushiki Kaisha, Tokyo (JP)

(72) Inventors: Masanori Nakazawa, Tokyo (JP); Hiroshi Hatayama, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 188 days.

(21) Appl. No.: 16/765,252

(22) PCT Filed: Nov. 20, 2018

(86) PCT No.: PCT/JP2018/042891
§ 371 (c)(1),
(2) Date: May 19, 2020

(87) PCT Pub. No.: WO2019/103011
PCT Pub. Date: May 31, 2019

(65) Prior Publication Data
US 2022/0006157 A1  Jan. 6, 2022

(30) Foreign Application Priority Data

Nov. 21, 2017 (JP) ................................ 2017-223764
Nov. 21, 2017 (JP) ................................ 2017-223776
Nov. 21, 2017 (JP) ................................ 2017-223796

(51) Int. Cl.
| | |
|---|---|
| H01M 50/451 | (2021.01) |
| H01M 50/417 | (2021.01) |
| H01M 10/0525 | (2010.01) |
| H01M 50/414 | (2021.01) |
| H01M 50/423 | (2021.01) |
| H01M 50/443 | (2021.01) |
| H01M 50/457 | (2021.01) |

(52) U.S. Cl.
CPC ..... *H01M 50/451* (2021.01); *H01M 10/0525* (2013.01); *H01M 50/414* (2021.01); *H01M 50/417* (2021.01); *H01M 50/423* (2021.01); *H01M 50/443* (2021.01); *H01M 50/457* (2021.01)

(58) Field of Classification Search
CPC .......................... H01M 50/451; H01M 50/417
USPC ........................................ 429/144, 251, 254
See application file for complete search history.

(56) References Cited

U.S. PATENT DOCUMENTS

| | | | | |
|---|---|---|---|---|
| 6,540,953 | B1 * | 4/2003 | Lee ...................... | B01D 67/009 264/210.4 |
| 8,962,173 | B1 * | 2/2015 | Liu ...................... | H01M 50/457 429/188 |
| 2003/0118908 | A1 | 6/2003 | Ishikawa et al. | |
| 2003/0124429 | A1 * | 7/2003 | Okada ................. | H01M 10/052 429/251 |
| 2013/0244082 | A1 | 9/2013 | Lee et al. | |
| 2015/0037653 | A1 * | 2/2015 | Saito .................... | B01D 67/002 429/145 |
| 2015/0050541 | A1 * | 2/2015 | Kinoshita ........... | H01M 50/423 429/144 |
| 2015/0050545 | A1 | 2/2015 | Murata et al. | |
| 2015/0303428 | A1 * | 10/2015 | Sawada ............... | H01M 50/489 427/496 |

FOREIGN PATENT DOCUMENTS

| | | |
|---|---|---|
| CN | 1945875 A | 4/2007 |
| CN | 107204414 A | 9/2017 |
| JP | 2010-219012 A | 9/2010 |
| JP | 2010219012 A * | 9/2010 |
| JP | 2011-238427 A | 11/2011 |
| JP | 2013-109866 A | 6/2013 |
| JP | 2014-004771 A | 1/2014 |
| JP | 2014-512650 A | 5/2014 |
| KR | 10-2017-0089031 A | 8/2017 |
| WO | 01/63687 A1 | 8/2001 |

OTHER PUBLICATIONS

"conduct, v.". OED Online. Jun. 2022. Oxford University Press. https://www.oed.com/viewdictionaryentry/Entry/38619 (accessed Jul. 25, 2022). (Year: 2022).*
"conduct." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1235212. (Year: 2010).*
Slifka et al., Thermal Conductivity of Magnesium Oxide From Absolute, Steady-State Measurements, 1998, Journal of Research of the National Institute of Standards and Technology, 103, 357-363 (Year: 1998).*
Lewis et al., The electrical conductivity of magnesium oxide at low temperatures, 1968, Journal of Physics D: Applied Physics, 1, 441-447 (Year: 1968).*
International Search Report issued in corresponding International Patent Application No. PCT/JP2018/042891 dated Dec. 25, 2018.
International Preliminary Report on Patentability and Written Opinion issued in corresponding International Patent Application No. PCT/JP2018/042891 dated Jun. 4, 2020.
Supplementary European Search Report issued in corresponding European Patent Application No. 18882165.6 dated Dec. 18, 2020.
Lagadec et al., "Characterization and performance evaluation of lithium-ion battery separators," Nature Energy, 4 (1): 16-25 (2018).
Supplementary European Search Report issued in corresponding European Patent Application No. 21182119.4 dated Nov. 5, 2021.
Supplementary European Search Report issued in corresponding European Patent Application No. 21182131.9 dated Nov. 5, 2021.

* cited by examiner

*Primary Examiner* — Sean P Cullen
(74) *Attorney, Agent, or Firm* — Morgan, Lewis & Bockius LLP

(57) ABSTRACT

Provided is a separator for electricity storage devices, which comprises an active layer that contains a material (A) that is capable of absorbing lithium (Li), and which has an air permeability of 650 s/100 ml or less.

15 Claims, No Drawings

SEPARATOR INCLUDING ACTIVE LAYER HAVING LITHIUM-OCCLUDING MATERIAL, AND ELECTRICITY STORAGE DEVICE INCLUDING THE SAME

FIELD

The present invention relates to a separator for an electricity storage device to be used as a power generating element in an electricity storage device (hereunder also referred to simply as "battery"), as well as to a battery using it and a vehicle or battery-mounted device employing the same.

BACKGROUND

In conventional electricity storage devices, a power generating element comprising a battery separator lying between a positive plate and negative plate is impregnated with an electrolyte solution.

When such an electricity storage device is operated under conditions where the device is charged with a relatively large current at relatively low temperature, lithium (Li) is often deposited at the negative plate, resulting in growth of metal Li from the negative plate in the form of dendrites (dendritic crystals). With continued growth of such dendrites, they may tear the separator or penetrate through to the positive plate or approach near the positive plate, potentially providing a pathway that causes a short circuiting problem. For example, in a nail-penetration test of a lithium ion secondary battery comprising a conventional single-layer separator composed of a base material alone, penetration of the nail to the positive electrode, separator and negative electrode causes electrons ($e^-$) in the nail to migrate very rapidly from the negative electrode to the positive electrode, while $Li^+$ ions also very rapidly migrate from the negative electrode to the positive electrode, thus leading to high current flow and higher heat release which tend to impair the safety.

When deposited dendrites (metal Li) are broken, it is often the case that highly reactive Li metal is present in a state that is not conductive to the negative plate. When a large amount of dendrites or metal Li produced by them is present in this manner and other locations have short circuited or released heat due to overcharge, reaction occurs at the surrounding highly reactive metal Li as well, which tends to create the problem of further heat release and can lead to deterioration of the battery capacity.

PTLs 1 to 3 teach that growth of dendrites can be inhibited if a layer of a compound that is capable of occluding Li is formed in an electricity storage device that comprises positive and negative electrodes and a separator.

CITATION LIST

Patent Literature

[PTL 1] International Patent Publication No. WO2001/063687
[PTL 2] Japanese Unexamined Patent Publication No. 2010-219012
[PTL 3] Japanese Unexamined Patent Publication No. 2013-109866

SUMMARY

Technical Problem

Inhibition of dendrite growth has been inadequate with the separators described in PTLs 1 to 3, however, and it has been difficult to ensure both the output characteristics and cycle characteristics of batteries. Furthermore, the separators described in PTLs 1 to 3 are still in need of testing in terms of safety, by electricity storage device nail-penetration tests or overcharge tests.

It is therefore an object of the present invention to provide a separator for an electricity storage device, that can efficiently inhibit dendrites and improve battery characteristics, cycle characteristics and safety, as well as an electricity storage device comprising the same.

Solution to Problem

As a result of cumulative research, the present inventors have found that the problem described above can be solved by adding an active layer to a separator for an electricity storage device and adjusting the air permeability of the separator for an electricity storage device, and we have thereupon completed this invention. Specifically, the present invention provides the following.

[1]
A separator for an electricity storage device, comprising an active layer having a material (A) that is able to occlude lithium (Li), wherein the separator for an electricity storage device has an air permeability of 650 s/100 ml or lower.

[2]
The separator for an electricity storage device according to [1], wherein the active layer comprises the material (A) that is able to occlude lithium, and a conducting material (B), and the mean particle diameter of the material (A) that is able to occlude lithium is at least 1.1 times the mean particle diameter of the conducting material (B).

[3]
The separator for an electricity storage device according to [2], wherein the mean particle diameter of the material (A) that is able to occlude lithium is at least 2 times the mean particle diameter of the conducting material (B).

[4]
The separator for an electricity storage device according to [2] or [3], wherein the mean particle diameter of the material (A) that is able to occlude lithium is no greater than 500 times the mean particle diameter of the conducting material (B).

[5]
The separator for an electricity storage device according to [1], wherein the active layer comprises the material (A) that is able to occlude lithium, and a conducting material (B), the mean particle diameter of the material (A) that is able to occlude lithium is 1 µm or larger and the mean particle diameter of the conducting material (B) is smaller than 1 µm.

[6]
The separator for an electricity storage device according to [5], wherein the mean particle diameter of the material (A) that is able to occlude lithium is 30 µm or smaller, and the mean particle diameter of the conducting material (B) is 0.005 µm or larger.

[7]
The separator for an electricity storage device according to any one of [2] to [6], wherein the mean particle diameter of the conducting material (B) is smaller than 0.1 µm.

[8]
The separator for an electricity storage device according to any one of [2] to [7], which comprises as the conducting material (B), one or more selected from the group consisting of carbon black; graphite; hard carbon; low temperature-fired carbon; amorphous carbon; carbon fibers; acetylene black; Al, Sb, Be, Cr, Cu, Au, Fe, Pb, Mg, Mn, Hg, Mo, Ni, Pt, Ag, Ti, Sn, Zr, Zn, Li, Na, K, Ca, V, Co, Mo, Y or an alloy thereof; monel; nichrome; steel; stainless steel or polythiophene; polyacetylene; polyaniline and polypyrrole.

[9]
The separator for an electricity storage device according to any one of [1] to [8], wherein the separator for an electricity storage device has at least one insulating layer, with the active layer being provided on the insulating layer.

[10]
The separator for an electricity storage device according to any one of [1] to [9], wherein the separator for an electricity storage device has a first insulating layer and a second insulating layer, with the active layer being sandwiched between the first insulating layer and the second insulating layer.

[11]
The separator for an electricity storage device according to [10], wherein the first insulating layer and the second insulating layer comprise one or more selected from the group consisting of polyolefins, polyphenylene ethers, polysulfones, polyethersulfones, polyphenylene sulfides, polyetherimides, polyamideimides, polyamides, polyesters and inorganic particles.

[12]
The separator for an electricity storage device according to [10], wherein the first insulating layer or the second insulating layer comprises a polyolefin resin, the polyolefin resin content in the first insulating layer or second insulating layer being 30 weight % or greater and 100 weight % or less.

[13]
The separator for an electricity storage device according to [1], wherein:
the separator for an electricity storage device comprises the active layer that comprises the material (A) that is able to occlude lithium, and first and second insulating layers that do not comprise the material (A) that is able to occlude lithium,
the active layer is sandwiched between the first insulating layer and the second insulating layer, and
the electrical resistivity of the active layer in the planar direction is $10^{-7}$ Ωcm or higher and 10.0 Ωcm or lower.

[14]
The separator for an electricity storage device according to [13], wherein the average number of pores in either or both of the first and second insulating layers is no greater than 135/μm².

[15]
The separator for an electricity storage device according to [13] or [14], wherein the average number of pores in either or both of the first and second insulating layers is 10/μm² or greater.

[16]
The separator for an electricity storage device according to [1], wherein:
the separator for an electricity storage device comprises the active layer that comprises the material (A) that is able to occlude lithium, and first and second insulating layers that do not comprise the material (A) that is able to occlude lithium,
the active layer is sandwiched between the first insulating layer and the second insulating layer, and
the electrical resistivity of the active layer in the planar direction is higher than 10.0 Ωcm and lower than $10^5$ Ωcm.

[17]
The separator for an electricity storage device according to [16], wherein the average number of pores in either or both of the first and second insulating layers is 10/μm² or greater.

[18]
The separator for an electricity storage device according to [16] or [17], wherein the average number of pores in either or both of the first and second insulating layers is no greater than 200/μm².

[19]
The separator for an electricity storage device according to any one of [13] to [18], wherein the first insulating layer or the second insulating layer comprises a polyolefin resin, the polyolefin resin content in the first insulating layer or second insulating layer being 30 weight % or greater and 100 weight % or less.

[20]
The separator for an electricity storage device according to any one of [10] to [19], wherein the mean pore size of either or both of the first and second insulating layers is 0.03 to 0.15 μm.

[21]
The separator for an electricity storage device according to any one of [10] to [20], wherein either or both of the first and second insulating layers comprise inorganic particles.

[22]
The separator for an electricity storage device according to [21], wherein the shapes of the inorganic particles are one or more selected from the group consisting of scaly, tabular and block shapes.

[23]
The separator for an electricity storage device according to [21] or [22], wherein the inorganic particles are one or more selected from the group consisting of alumina, aluminum hydroxide, aluminum hydroxide oxide, aluminum silicate, barium sulfate and zirconia.

[24]
The separator for an electricity storage device according to any one of [1] to [23], wherein the material (A) that is able to occlude lithium is flaky, scaly, tabular, block-shaped or spherical.

[25]
The separator for an electricity storage device according to any one of [1] to [24], wherein the voltage value during short circuiting in a withstand voltage measurement test is 0.3 to 4.5 kV.

[26]
The separator for an electricity storage device according to any one of [1] to [25], wherein the air permeability is 30 s/100 ml or greater.

[27]
An electricity storage device comprising a positive electrode, a separator for an electricity storage device according to any one of [1] to [26], a negative electrode, and an electrolyte solution.

[28]
An electricity storage device comprising a positive electrode, the separator for an electricity storage device according to any one of [1] to [26], a negative electrode and a lithium (Li)-conducting medium, wherein the Li-conducting medium is in gel form or solid form.

[29]
The electricity storage device according to [27] or [28], wherein the separator for an electricity storage device has an insulating layer comprising inorganic particles and the insulating layer comprising the inorganic particles is disposed so as to contact at least a portion of the negative electrode surface.

[30]

The electricity storage device according to any one of [27] to [29], wherein the potential (vsLi$^+$/Li) of the negative electrode during charge is lower than the potential (vsLi$^+$/Li) of the material (A) that is able to occlude lithium (Li).

[31]

The electricity storage device according to any one of [27] to [30], which is a lithium battery or a lithium ion secondary battery.

Advantageous Effects of Invention

According to the invention it is possible to efficiently inhibit generation or growth of dendrites and to improve the battery characteristics and safety of electricity storage devices. If the invention is implemented, then even when dendrites have grown from the negative plate in an electricity storage device, it is possible to inhibit that growth, inhibit short circuiting and to improve the safety of the electricity storage device in a nail-penetration test, as well as its battery output characteristics and cycle characteristics. Furthermore, according to the invention it is possible to ensure very high safety of electricity storage devices in both nail-penetration testing and overcharge testing.

DESCRIPTION OF EMBODIMENTS

An embodiment of the invention (hereunder referred to as "the embodiment") will now be explained in detail as an example, with the understanding that the invention is not limited to the embodiment. The upper limits and lower limits for the numerical ranges throughout the present specification may be combined as desired. Unless otherwise indicated, measurement of the different numerical values may be carried out by the methods described in the Examples.

Separator

The separator for an electricity storage device according to the embodiment (hereunder referred to as "separator") comprises an active layer having a material (A) that is able to occlude lithium (Li), wherein the air permeability is 650 s/100 ml or lower. For the embodiment, material (A) in the active layer ensures ion permeability while efficiently inhibiting growth of dendrites to contribute to the safety of the electricity storage device, and the separator that has an air permeability of no greater than 650 s/100 ml tends to exhibit satisfactory electrical characteristics and cycle characteristics. From the viewpoint of the electrical characteristics and cycle characteristics, the air permeability of the separator is preferably no greater than 600 s/100 ml, no greater than 550 s/100 ml, no greater than 500 s/100 ml, no greater than 450 s/100 ml or no greater than 400 s/100 ml, while from the viewpoint of strength and safety it is preferably 30 s/100 ml or greater, 100 s/100 ml or greater, 120 s/100 ml or greater, 140 s/100 ml or greater or 160 s/100 ml or greater.

The separator may optionally include a resin, a conducting material (B), an inorganic filler, an organic filler or the like in addition to the material (A) that is able to occlude lithium (Li).

The structure of the separator of the embodiment may be either a single layer or a laminate. A single-layer separator usually comprises a base material such as a polyolefin microporous membrane, while a layered separator usually includes a base material and one or more laminated layers on the base material. At least one layer may have an insulating property, an adhesive property, a thermoplastic property or an inorganic porous property, for example, and it may be formed as a single membrane, or as a pattern formed by dot coating, stripe coating or the like. For the embodiment, the active layer having material (A) that is able to occlude lithium may not only form a single-layer separator as a base material, but it may also be disposed on the base material of a layered separator. The active layer may be formed as a single layer on a base material, or alternatively it may also include a pattern formed by dot coating or stripe coating, formed on a base material.

Preferred Embodiment 1 for Separator

According to a preferred embodiment 1, the active layer of the separator comprises a material (A) that is able to occlude lithium and a conducting material (B), where the mean particle diameter of the material (A) that is able to occlude lithium is at least 1.1 times the mean particle diameter of the conducting material (B). For embodiment 1, from the viewpoint of the mean particle diameter, that of the material (A) capable of occluding lithium is 1.1 times or larger than that of the conducting material (B). The material (A) that is able to occlude lithium has relatively large dimensions and increases the lithium occlusion volume, while the conducting material (B) has relatively small dimensions and can therefore improve conductivity due to its contact points with material (A). The separator of preferred embodiment 1 therefore has satisfactory lithium diffusibility, and the active layer as a whole can be used in an electricity storage device as a dendrite trap to effectively inhibit dendrites. From the same viewpoint, the material (A) that is able to occlude lithium more preferably has a mean particle diameter of at least 1.3 times, at least 2 times or at least 2.5 times or larger than that of conducting material (B). From the viewpoint of conductivity, total separator thickness and ion permeability, the mean particle diameter of the material (A) that is able to occlude lithium is more preferably no greater than 500 times, no greater than 300 times, no greater than 250 times, no greater than 200 times, no greater than 150 times, no greater than 100 times or no greater than 50.0 times that of the conducting material (B).

From the viewpoint of ensuring ion permeability while efficiently inhibiting growth of dendrites, the lower limit for the mean particle diameter of the material (A) that is able to occlude lithium is preferably 1 μm or larger or 2 μm or larger, and the upper limit is preferably no larger than 30 μm or no larger than 29 μm.

From the viewpoint of inhibiting dendrites, and the safety of the electricity storage device, the lower limit for the mean particle diameter of the conducting material (B) is preferably 0.005 μm or larger, and the upper limit is preferably smaller than 1 μm, no larger than 0.8 μm, no larger than 0.7 μm, or smaller than 0.1 μm.

As mentioned above, the material (A) that is able to occlude lithium and the conducting material (B) can be distinguished based on their mean particle diameters. For the purpose of the present specification, it is acceptable for materials (A) and (B) to be formed of the same type of chemical substance, such as graphite for example, so long as materials (A) and (B) can be distinguished based on their mean particle diameters. Specifically, when multiple materials are derived from a single substance, the multiple materials that can be distinguished based on their mean particle diameters may be labeled as "(A)" and "(B)", or when a specific material has been formed from a single substance, materials (A) and (B) may be selected by widening the particle diameter distribution of the material using physical, mechanical or chemical means.

In the case of a single-layer separator for embodiment 1, both the material (A) that is able to occlude lithium and the conducting material (B) may be added to a base material, and the active layer used as the base material, or in the case of a layered separator, an active layer comprising both the material (A) that is able to occlude lithium and the conducting material (B) may be formed on a base material. A layered separator preferably includes an active layer and at least one insulating layer, with the active layer formed on the insulating layer, and more preferably it has a first insulating layer and a second insulating layer with the active layer sandwiched between the first insulating layer and the second insulating layer. The first insulating layer and second insulating layer preferably comprise one or more selected from the group consisting of polyolefins, polyphenylene ethers, polysulfones, polyethersulfones, polyphenylene sulfides, polyetherimides, polyamideimides, polyamides, polyesters and inorganic particles, from the viewpoint of ensuring insulation between the active layer and the electrodes. From the viewpoint of use as a base material, the first insulating layer or second insulating layer preferably comprises a polyolefin resin, and/or the polyolefin resin content in the first insulating layer or second insulating layer is 30 weight % or greater and 100 weight % or less. From the same viewpoint, the polyolefin resin content in the base material is preferably 30 to 100 weight % or 32 to 98 weight %.

Preferred Embodiment 2 for Separator

The separator according to a preferred embodiment 2 comprises an active layer that comprises a material (A) that is able to occlude lithium, and first and second insulating layers that do not comprise a material (A) that is able to occlude lithium, wherein the active layer is sandwiched between the first insulating layer and the second insulating layer, and the electrical resistivity of the active layer in the planar direction is $10^{-7}$ Ωcm or higher and 10.0 Ωcm or lower.

The separator of embodiment 2 has a layered structure, and more specifically it has a layered structure with an active layer comprising the material (A) that is able to occlude lithium, sandwiched between a plurality of insulating layers. When a separator having such a layered structure is disposed in an electricity storage device, the active layer comprising the material (A) that is able to occlude lithium will be layered not on the outermost layer of the separator but rather as an interlayer, so that an insulating layer will be present between the active layer and the electrode active material layer. Since the active layer comprising the material (A) that is able to occlude lithium is disposed as an interlayer independently from the charge-discharge circuit, it is unable to provide electrons, and consequently lithium will not be trapped during device charge and movement of lithium ions will also not be impeded. However, when lithium dendrites that have grown from the electrode active material layer contact with the active layer comprising the material (A) that is able to occlude lithium, the active layer traps lithium dendrites due to the difference in potential. Therefore, a layered structure in which the active layer comprising the material (A) that is able to occlude lithium is sandwiched between multiple insulating layers tends to improve the safety and charge-discharge capacity.

The active layer of embodiment 2 has an electrical resistivity of $10^{-7}$ Ωcm or higher and 10.0 Ωcm or lower in the planar direction. If the electrical resistivity is 10.0 Ωcm or lower, the active layer will efficiently absorb lithium (Li) as dendrites, and the effect of inhibiting short circuiting will drastically increase. The electrical resistivity of the active layer is more preferably $10^{-4}$ Ωcm or higher and 10.0 Ωcm or lower, or 0.001 to 1.0 Ωcm and even more preferably 0.005 to 0.5 Ωcm. The electrical resistivity can be adjusted to within the range of $10^{-7}$ Ωcm or higher and 10.0 Ωcm or lower by controlling the abundance ratio of the insulating material and the conductive substance in the active layer. For example when the material (A) that is able to occlude lithium is a conductive substance such as graphite, it is possible to adjust the electrical resistivity depending on the mixing ratio of the conductive substance, the insulating binder and the insulating filler. When the material (A) that is able to occlude lithium is an insulating material, on the other hand, it is possible to adjust the electrical resistivity by adding a conductive aid to the insulating material. The electrical resistivity can also be adjusted in a different manner by coating the material (A) that is able to occlude lithium, with a conductive substance, or by coating the conductive aid with a substance having high electrical resistivity so as to add the coated, conductive aid to the insulating material.

In embodiment 2, the average number of pores of either or both the first and second insulating layers is preferably no greater than $135/\mu m^2$, more preferably no greater than $130/\mu m^2$, or no greater than $125/\mu m^2$, no greater than $120/\mu m^2$, no greater than $100/\mu m^2$, no greater than $80/\mu m^2$ or no greater than $60/\mu m^2$. When the average number of pores is reduced and the pore size is increased in a conventional separator, increased output tends to be offset by lower dendrite resistance, but the separator of embodiment 2, which combines both an insulating layer having an average number of pores of no greater than $135/\mu m^2$ and an interlayer with satisfactory lithium diffusibility (i.e. an active layer sandwiched between two insulating layers) it is possible to achieve both high output characteristics and dendrite resistance. From the viewpoint of ion permeability and safety, the average number of pores of either or both the first and second insulating layers is also preferably $10/\mu m^2$ or greater, and more preferably $20/\mu m^2$ or greater or $30/\mu m^2$ or greater.

From the viewpoint of use as a base material, the first insulating layer or second insulating layer for embodiment 2 preferably comprises a polyolefin resin, and/or the polyolefin resin content in the first insulating layer or second insulating layer is 30 weight % or greater and 100 weight % or less. From the same viewpoint, the polyolefin resin content in the base material is preferably 30 to 100 weight % or 32 to 98 weight %.

Preferred Embodiment 3 for Separator

The separator according to a preferred embodiment 3 comprises an active layer that comprises a material (A) that is able to occlude lithium, and first and second insulating layers that do not comprise a material (A) that is able to occlude lithium, wherein the active layer is sandwiched between the first insulating layer and the second insulating layer, and the electrical resistivity of the active layer in the planar direction is 10.0 Ωcm or higher and lower than $10^5$ Ωcm.

The separator of embodiment 3 has a layered structure, and more specifically it has a layered structure with an active layer comprising the material (A) that is able to occlude lithium, sandwiched between a plurality of insulating layers. When a separator having such a layered structure is disposed in an electricity storage device, the active layer comprising the material (A) that is able to occlude lithium will be layered not on the outermost layer of the separator but rather as an interlayer, so that an insulating layer will be present between the active layer and the electrode active material layer. Since the active layer comprising the material (A) that is able to occlude lithium is disposed as an interlayer independently from the charge-discharge circuit, it is unable to provide electrons, and consequently lithium will not be trapped during device charge and movement of lithium ions will also not be impeded. However, when lithium dendrites that have grown from the electrode active material layer contact with the active layer comprising the material (A) that is able to occlude lithium, the active layer traps the lithium dendrites due to the difference in potential. For example, in a nail-penetration test for a lithium ion secondary battery, trapping of $Li^+$ in the interlayer during conduction can result in migration resistance against electrons migrating from the negative electrode to the positive electrode. Furthermore, since the electrical resistivity of the active layer as the interlayer is 10.0 Ωcm or higher for embodiment 3, the current value is also lowered and the heat value during short circuiting also tends to decrease. Since the upper limit for the electrical resistivity of the interlayer is less than $10^5$ Ωcm, it is also easier to avoid the phenomenon in which the resistance increases too much and lithium ions bypass the interlayer. Therefore, a layered structure in which the active layer comprising the material (A) that is able to occlude lithium is sandwiched between multiple insulating layers tends to improve the safety or charge-discharge capacity.

The active layer of embodiment 3 has an electrical resistivity of 10.0 Ωcm or higher in the planar direction. If the electrical resistivity is 10.0 Ωcm or higher, then dissipation of conduction along the planar direction of the separator between the positive and negative electrodes will be eliminated in the range of the working voltage of the electricity storage device, inhibiting thermal runaway, for example, and markedly improving the safety of the device. The electrical resistivity of the active layer is more preferably higher than 10.0 Ωcm, or 100 Ωcm or higher, and even more preferably 1,000 Ωcm or higher. The upper limit for the electrical resistivity of the active layer is lower than $10^5$ Ωcm, preferably lower than 50,000 Ωcm and more preferably lower than 10,000 Ωcm. Establishing an upper limit allows trapped lithium dendrites to diffuse throughout the active layer without locally accumulating, so that the active layer as a whole can be used as a trap for lithium dendrites and dendrites can be efficiently suppressed during overcharge. The electrical resistivity can be adjusted by controlling the abundance ratio of the insulating material and the conductive substance in the active layer. For example when the material (A) that is able to occlude lithium is a conductive substance such as graphite, it is possible to adjust the electrical resistivity depending on the mixing ratio of the conductive substance, the insulating binder and the insulating filler. When the material (A) that is able to occlude lithium is an insulating material, on the other hand, it is possible to adjust the electrical resistivity by adding a conductive aid to the insulating material. The electrical resistivity can also be adjusted in a different manner by coating the material (A) that is able to occlude lithium, with a conductive substance, or by coating the conductive aid with a substance having high electrical resistivity so as to add the coated, conductive aid to the insulating material.

In embodiment 3, the average number of pores of either or both the first and second insulating layers is preferably $10/\mu m^2$ or greater and more preferably $50/\mu m^2$ or greater, $60/\mu m^2$ or greater, $70/\mu m^2$ or greater or $80/\mu m^2$ or greater. An insulating layer with an average number of pores of $10/\mu m^2$ or greater preferably also includes an insulating resin. If the average number of pores of the insulating layer is $10/\mu m^2$ or greater, then in a nail-penetration test for a lithium ion secondary battery comprising the separator of embodiment 3, for example, there will be an increased probability of resin around the nail during nail penetration. More specifically, during the initial heat release due to nailing, the insulating resin from the insulating layer adheres to the nail, increasing the electronic resistance at the resin-adhered sections of the nail and inhibiting short-circuit current, thereby allowing the heat value to be reduced. The average number of pores of either or both the first and second insulating layers is preferably no greater than $200/\mu m^2$, no greater than $180/\mu m^2$, no greater than $160/\mu m^2$ or no greater than $140/\mu m^2$ from the viewpoint of both high output characteristics and dendrite resistance.

From the viewpoint of use as a base material, the first insulating layer or second insulating layer for embodiment 3 preferably comprises a polyolefin resin, and/or the polyolefin resin content in the first insulating layer or second insulating layer is 30 weight % or greater and 100 weight % or less. From the same viewpoint, the polyolefin resin content in the base material is preferably 30 to 100 weight % or 32 to 98 weight %.

The constituent elements, production method and physical properties of the separators of embodiments 1 to 3 will now be described.

Separator Contents

The separator comprises a material (A) that is able to occlude lithium. The separator may optionally include a resin, a conducting material (B), an inorganic filler, an organic filler or the like in addition to the material (A) that is able to occlude lithium.

Material (A) that is Able to Occlude Lithium (Li)

As material (A) there may be used any compounds that are able to occlude (including "intercalate", "be alloyed with" and "be chemically converted by reaction with") lithium (Li), examples of which include negative electrode active materials of lithium ion secondary batteries. Specifically, these include silicon, silicon monoxide, lithium alloys (for example, lithium metal-containing alloys such as lithium-aluminum, lithium-lead, lithium-tin, lithium-aluminum-tin, lithium-gallium and Wood's alloy), carbon materials (for example, graphite, hard carbon, low temperature-fired carbon and amorphous carbon), metal oxides, lithium metal oxides (for example, $Li_4Ti_5O_{12}$), polyphosphoric acid compounds and transition metal sulfides. Preferred for use among these are carbon materials, silicon, silicon monoxide and lithium metal oxides (such as $Li_4Ti_5O_{12}$). This may also include compounds that react with lithium, such as compounds that are reductively decomposed by lithium. By using such a material it is possible to fabricate an electricity storage device having excellent safety, output and cycle characteristics.

The form of material (A) is preferably particulate from the viewpoint of heat resistance and permeability, while from the viewpoint of inhibiting dendrites it is preferably flaky, scaly, tabular, block-shaped or spherical, and more preferably particulate, flaky or scaly.

The mean particle diameter of material (A) for embodiment 1 is preferably 0.01 µm or larger, and more preferably 0.05 µm or larger, 0.10 µm or larger, 0.50 µm or larger or 1 µm or larger, from the viewpoint of ion permeability and of efficiently inhibiting dendrites. The mean particle diameter of material (A) is preferably larger than 1.0 µm, more preferably 1.5 µm or larger and even more preferably 2.5 µm or larger from the viewpoint of lowering the water content of the separator and more efficiently inhibiting dendrites. The upper limit for the mean particle diameter of material (A) is not particularly restricted but is preferably no larger than 15.0 µm or no larger than 6.0, and more preferably no larger than 5.0 µm, from the viewpoint of reducing heat shrinkage of the separator.

When material (A) for embodiment 2 or 3 is particulate, the mean particle diameter is preferably 0.01 µm or larger, more preferably 0.05 µm or larger and even more preferably 0.1 µm or larger, with an upper limit of preferably no larger than 15.0 µm, more preferably no larger than 5.0 µm and even more preferably no larger than 3.0 µm. The mean particle diameter is preferably adjusted to 0.01 µm or larger from the viewpoint of lowering the water content of the separator. On the other hand, the mean particle diameter is preferably adjusted to no larger than 15.0 µm from the viewpoint of efficiently inhibiting growth of lithium dendrites and reducing the heat shrinkage factor of the separator to help prevent membrane rupture. The mean particle diameter is also preferably adjusted to no larger than 3.0 µm from the viewpoint of satisfactorily forming a porous layer with a small layer thickness, and from the viewpoint of dispersibility of the inorganic filler in the porous layer.

As used herein, the mean particle diameter of the material (A) that is able to occlude lithium is the value measured by the measuring method described in the Examples below, using an SEM.

Conducting Material (B)

The conducting material (B) comprises a conductive substance. A conductive substance is a substance having an electrical resistivity of no higher than 0.1 Ωcm. Examples that may be used include metals (Al, Sb, Be, Cr, Cu, Au, Fe, Pb, Mg, Mn, Hg, Mo, Ni, Pt, Ag, Ti, Sn, Zr, Zn, Li, Na, K, Ca, V, Co, Mo, Y, or an alloy thereof; monel; nichrome; steel; stainless steel and the like), metalloids, non-metals such as carbon materials (for example, graphite, hard carbon, low temperature-fired carbon, amorphous carbon, carbon fiber, acetylene black and carbon black), or conductive polymers (for example, conductive polymers having conjugated polyene sites, such as polythiophene, polyacetylene, polyaniline, polypyrrole, etc.), or silicone comprising one or more of the foregoing. There may also be used insulating particles coated with a conductive substance. Of these, carbon materials are preferred, graphite or carbon black is more preferred, and carbon black is even more preferred. By using such materials it is possible to increase the reactivity between the material that is capable of occluding lithium and the Li dendrites, thus tending to allow growth of dendrites to be inhibited for longer periods.

The mean particle diameter of the conducting material (B) is preferably smaller than 1 µm. If the mean particle diameter of the conducting material (B) is smaller than 1 µm the contact area with the material that is capable of occluding lithium will increase, thus allowing Li dendrites to be trapped more efficiently. The mean particle diameter of the conducting material (B) is more preferably no larger than 0.7 µm, even more preferably no larger than 0.5 µm, and yet more preferably no larger than 0.1 µm or less than 0.1 µm. The lower limit for the mean particle diameter of the conducting material (B) is not particularly restricted but may be 0.001 µm or larger or 0.005 µm or larger, from the viewpoint of slurry stability and of lowering the water content of the separator.

The mixing ratio (A):(B) between the material (A) that is able to occlude lithium (Li) and the conducting material (B) is preferably 1.0:99.0 to 99.9:0.1, more preferably 5.0:95.0 to 99.0:1.0 or 10.0:90.0 to 98.0:2.0, and even more preferably 20.0:80.0 to 97.0:3.0. By adjusting the mixing ratio between the material (A) that is able to occlude lithium (Li) and the conducting material (B) to within this range it is possible to increase the lithium dendrite trapping capacity, and to allow more efficient trapping.

Inorganic Filler

Examples of inorganic fillers include oxide-based ceramics such as alumina, silica, titanic, zirconia, magnesia, ceria, yttria, zinc oxide and iron oxide, nitride-based ceramics such as silicon nitride, titanium nitride and boron nitride, ceramics such as silicon carbide, calcium carbonate, aluminum sulfate, aluminum hydroxide, aluminum hydroxide oxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth and quartz sand, and glass fibers. Any of these may be used alone or in combinations of two or more. Preferred among these are alumina, aluminum hydroxide, aluminum hydroxide oxide, aluminum silicate, barium sulfate and zirconia, with aluminum silicate, barium sulfate and zirconia being more preferred, from the viewpoint of electrochemical stability.

Organic Filler

Examples of organic fillers include various crosslinked macromolecular fine particles such as crosslinked polyacrylic acid, crosslinked polyacrylic acid esters, crosslinked polymethacrylic acid, crosslinked polymethacrylic acid esters, crosslinked polymethyl methacrylate, crosslinked polysilicone (such as polymethylsilsesquioxane), crosslinked polystyrene, crosslinked polydivinylbenzene, styrene-divinylbenzene copolymer crosslinked products, polyimides, melamine resins, phenol resins, benzoguanamine-formaldehyde condensates; and heat-resistant macromolecular fine particles of polysulfone, polyacrylonitrile, aramid, polyacetal, thermoplastic polyimide and the like. The organic resins (polymers) composing these organic fine particles may be mixtures, modified forms, derivatives, copolymers (random copolymers, alternating copolymers, block copolymers or graft copolymers) or crosslinked products (for heat-resistant polymers) of the materials mentioned above. Preferred are one or more resins selected from the group consisting of crosslinked polyacrylic acid, crosslinked polyacrylic acid esters, crosslinked polymethacrylic acid, crosslinked polymethacrylic acid esters, crosslinked polymethyl methacrylate and crosslinked polysilicone (such as polymethylsilsesquioxane).

Resin

The resin to be included in the separator is a resin having a melting point and/or glass transition temperature of 180°

C. or higher, examples of which include polyolefins such as polyethylene or polypropylene; fluorine-containing resins such as polyvinylidene fluoride or polytetrafluoroethylene; fluorinated rubbers such as vinylidene fluoride-hexafluoropropylene-tetrafluoroethylene copolymer or ethylene-tetrafluoroethylene copolymer; rubbers such as styrene-butadiene copolymer and its hydrogenated forms, acrylonitrile-butadiene copolymer and its hydrogenated forms, acrylonitrile-butadiene-styrene copolymer and its hydrogenated forms, methacrylic acid ester-acrylic acid ester copolymer, styrene-acrylic acid ester copolymer, acrylonitrile-acrylic acid ester copolymer, ethylene-propylene rubber, polyvinyl alcohol and polyvinyl acetate; cellulose derivatives such as ethyl cellulose, methyl cellulose, hydroxyethyl cellulose and carboxymethyl cellulose; and polyphenylene ethers, polysulfones, polyethersulfones, polyphenylene sulfides, polyetherimides, polyamideimides, polyamides, polyesters and the like. These may be used either alone or in combinations of two or more.

The viscosity-average molecular weight of a polyolefin used in the resin is preferably 1,000 or higher, more preferably 2,000 or higher and even more preferably 5,000 or higher, with an upper limit of preferably lower than 12,000,000, more preferably lower than 2,000,000 and even more preferably lower than 1,000,000, from the viewpoint of molding workability.

Layer Comprising Material (A) that is Able to Occlude Lithium (Active Layer)

The active layer is a layer comprising the material (A) that is able to occlude lithium. When the active layer according to embodiments 1 to 3 comprises a material (A) that is able to occlude lithium and the resin described above, the content ratio (weight fraction) of the material (A) and resin in the active layer is preferably 10% or greater, more preferably 30% or greater, even more preferably 50% or greater and most preferably 90% or greater, with an upper limit of preferably less than 100%, preferably no greater than 99.99%, more preferably no greater than 99.9% and even more preferably no greater than 99%, from the viewpoint of the dendrite-inhibiting effect and heat resistance. From the same viewpoint, the percentage (weight fraction) of the material (A) that is able to occlude lithium and the conducting material (B) in the active layer for embodiment 1 is preferably 10% or greater, more preferably 30% or greater, even more preferably 50% or greater and most preferably 90% or greater, with an upper limit of preferably less than 100%, preferably no greater than 99.99%, more preferably no greater than 99.9% and even more preferably no greater than 99%.

The resins mentioned above may be used for the resin in the active layer of embodiments 1 to 3, which is preferably able to bind the material (A) and/or the conducting material (B), is insoluble in the electrolyte solution of the electricity storage device, and is electrochemically stable when the electricity storage device is used.

In embodiment 1, the percentage of the resin with respect to the total amount of materials (A) and (B) and the resin, in terms of volume fraction, is preferably 0.5% or greater, more preferably 1.0% or greater, even more preferably 3.0% or greater and most preferably 5.0% or greater as the lower limit, and preferably no greater than 80% and more preferably no greater than 60% as the upper limit, from the viewpoint of binding between the different components forming the active component. Adjusting the percentage to 0.5% or greater is suitable from the viewpoint of adequately binding the material (A) and helping to reduce detachment and loss (or in other words, from the viewpoint of adequately ensuring satisfactory manageability). On the other hand, adjusting the percentage to no greater than 80% is suitable from the viewpoint of achieving satisfactory ion permeability for the separator.

The percentage of the resin according to embodiment 2 or 3 with respect to the total amount of the material (A) that is able to occlude lithium and the resin, in terms of volume fraction, is preferably 0.5% or greater, more preferably 1.0% or greater, even more preferably 3.0% or greater and most preferably 5.0% or greater as the lower limit, and preferably no greater than 80% and more preferably no greater than 60% as the upper limit, from the viewpoint of binding with both. Adjusting this proportion to 0.5% or greater is suitable from the viewpoint of adequately binding the material (A) and helping to reduce detachment and loss (or in other words, from the viewpoint of adequately ensuring satisfactory manageability). On the other hand, adjusting the proportion to no greater than 80% is suitable from the viewpoint of achieving satisfactory ion permeability for the separator.

The lower limit for the layer thickness of the active layer is preferably 0.5 µm or larger, more preferably 2 µm or larger, even more preferably 3 µm or larger and most preferably 4 µm or larger, from the viewpoint of the dendrite-inhibiting effect and of improving heat resistance. The upper limit for the layer thickness is preferably 100 µm or smaller, more preferably 50 µm or smaller, even more preferably 30 µm or smaller, especially preferably 20 µm or smaller and most preferably 10 µm or smaller, from the viewpoint of permeability or achieving high battery capacitance.

Insulating Layer

The separator of embodiment 1 preferably also includes, in addition to the active layer comprising the material (A) that is able to occlude lithium, at least one insulating layer that is able to support the active layer, and more preferably it includes at least two such insulating layers. The separator of embodiment 2 or 3 comprises first and second insulating layers that do not comprise a material (A) that is able to occlude lithium, with the active layer comprising the material (A) that is able to occlude lithium being inserted between the first insulating layer and the second insulating layer.

The insulating layers are not particularly restricted so long as they are layers capable of ensuring electrical insulation, and examples include resin layers such as polyolefin microporous membranes, inorganic porous layers comprising inorganic particles and a resin that binds the inorganic particles, and organic filler layers comprising an organic filler and a resin that binds the organic filler.

Examples of such inorganic particles include oxide-based ceramics such as alumina, silica, titania, zirconia, magnesia, ceria, yttria, zinc oxide and iron oxide; nitride-based ceramics such as silicon nitride, titanium nitride and boron nitride; ceramics such as silicon carbide, calcium carbonate, aluminum sulfate, aluminum hydroxide, aluminum hydroxide oxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth and quartz sand; and glass fibers. Any of these may be used alone or in combinations of two or more. Preferred among these are alumina, aluminum hydroxide, aluminum hydroxide oxide, aluminum silicate, barium sulfate and zirconia, with aluminum silicate, barium sulfate and zirconia being more preferred, from the viewpoint of electrochemical stability.

Examples of organic fillers include various crosslinked macromolecular fine particles such as crosslinked polyacrylic acid, crosslinked polyacrylic acid esters, crosslinked polymethacrylic acid, crosslinked polymethacrylic acid esters, crosslinked polymethyl methacrylate, crosslinked polysilicone (polymethylsilsesquioxane, for example), crosslinked polystyrene, crosslinked polydivinylbenzene, styrene-divinylbenzene copolymer crosslinked products, polyimide, melamine resins, phenol resins, benzoguanamine-formaldehyde condensates; and heat-resistant macromolecular fine particles of polysulfone, polyacrylonitrile, aramid, polyacetal, thermoplastic polyimide and the like. The organic resins (polymers) composing these organic fine particles may be mixtures, modified forms, derivatives, copolymers (random copolymers, alternating copolymers, block copolymers or graft copolymers, for example) or in the case of heat-resistant polymers, crosslinked products, of the materials mentioned above. Preferred are one or more resins selected from the group consisting of crosslinked polyacrylic acid, crosslinked polyacrylic acid esters, crosslinked polymethacrylic acid, crosslinked polymethacrylic acid esters, crosslinked polymethyl methacrylate and crosslinked polysilicone (polymethylsilsesquioxane, for example).

There are no particular restrictions on the form of the inorganic particles and organic filler, but from the viewpoint of heat resistance they are preferably scaly, tabular or block-shaped, especially when the insulating layer includes inorganic particles.

Resins that bind together inorganic particles or organic fillers include the following 1) to 4):

1) Conjugated diene-based polymers
2) Acrylic-based polymers,
3) Polyvinyl alcohol-based resins or cellulose polymers, and
4) Fluorine-containing resins.

1) A conjugated diene-based polymer is a polymer that includes a conjugated diene compound as a monomer unit. Examples of conjugated diene compounds include 1,3-butadiene, 2-methyl-1,3-butadiene, 2,3-dimethyl-1,3-butadiene, 2-chlor-1,3-butadiene, styrene-butadiene, substituted straight-chain conjugated pentadienes and substituted or side chain-conjugated hexadienes, any of which may be used alone or in combinations of two or more. From the viewpoint of a high binding property, 1,3-butadiene is preferred among these.

2) An acrylic-based polymer is a polymer that includes a (meth)acrylic-based compound as a monomer unit. A (meth)acrylic-based compound is at least one compound selected from the group consisting of (meth)acrylic acid and (meth)acrylic acid esters.

Examples of such compounds include compounds represented by the following formula (P1).

$$CH_2=CR^{Y1}-COO-R^{Y2} \qquad (P1)$$

{wherein $R^{Y1}$ represents a hydrogen atom or a methyl group, and $R^{Y2}$ represents a hydrogen atom or a monovalent hydrocarbon group.}

When $R^{Y2}$ is a monovalent hydrocarbon group, it may have a substituent, and/or it may have a heteroatom in the chain. Examples of monovalent hydrocarbon groups include straight-chain or branched chain alkyl, cycloalkyl and aryl groups.

More specifically, linear alkyl groups for $R^{Y2}$ include chain alkyl groups of 1 to 3 carbon atoms such as methyl, ethyl, n-propyl and isopropyl groups; and chain alkyl groups of 4 or more carbon atoms such as n-butyl, isobutyl, t-butyl, n-hexyl, 2-ethylhexyl and lauryl groups. Examples of aryl groups for $R^{Y2}$ include phenyl groups.

Examples of substituents for a monovalent hydrocarbon group include hydroxyl and phenyl groups, and examples of heteroatoms in the chain include halogen and oxygen atoms.

Such (meth)acrylic-based compounds include (meth)acrylic acid, linear alkyl (meth)acrylates, cycloalkyl (meth)acrylates, (meth)acrylates with hydroxyl groups, and (meth)acrylates with phenyl groups. A single (meth)acrylic-based compound may be used alone, or two or more thereof may be used in combination.

3) Examples of polyvinyl alcohol-based resins include polyvinyl alcohol and polyvinyl acetate. 3) Examples of cellulosic copolymers include carboxymethyl cellulose and carboxyethyl cellulose.

4) Examples of fluorine-containing resins include polyvinylidene fluoride, polytetrafluoroethylene, vinylidene fluoride-hexafluoropropylene copolymer, vinylidene fluoride-hexafluoropropylene-tetrafluoroethylene copolymer and ethylene-tetrafluoroethylene copolymer.

In order to ensure a layered structure for the separator exhibiting excellent safety and charge-discharge capacity, the insulating layer preferably does not comprise a material (A) that is able to occlude lithium. Specifically, the insulating layer does not need to comprise material (A) described above. When the separator of embodiment 1 has a layered structure composed of a plurality of layers, only the insulating layer situated on the outermost surface that is to contact with the electrode may lack material (A) described above.

The average number of pores in the insulating layer of embodiment 1 is preferably no greater than $135/\mu m^2$. By adjusting the average number of pores to no greater than $135/\mu m^2$ it is possible to significantly reduce the rate of short circuiting due to dendrites. The average number of pores is more preferably no greater than $100/\mu mm^2$, even more preferably no greater than $80/\mu m^2$ and yet more preferably no greater than $60/\mu m^2$. The lower limit for the average number of pores is preferably $10/\mu m^2$ or greater, more preferably $20/\mu m^2$ or greater and even more preferably $30/\mu m^2$ or greater. By adjusting the lower limit to $10/\mu m^2$ or greater, intercalation and desorption of Li at the electrode surface will be smooth and the output and/or cycle characteristics will tend to be improved.

The mean pore size of the insulating layer is preferably 0.030 to 0.200 μm. By adjusting the mean pore size to within the range of 0.030 to 0.200 μm it is possible to increase the output characteristic of the electricity storage device while maintaining high membrane strength. From the viewpoint of a high output characteristic, the mean pore size is more preferably 0.065 to 0.180 μm, even more preferably 0.080 to 0.150 μm and yet more preferably 0.100 to 0.150 μm.

When the separator of embodiments 1 to 3 has two or more insulating layers, where the two insulating layers sandwiching the active layer are denoted as first and second insulating layers, the mean pore size of either or both of the first and second insulating layers is preferably 0.03 to 0.15 μm, 0.06 to 0.14 μm or 0.065 to 0.1 μm, from the viewpoint of both high output characteristics and of inhibiting dendrites. From the same viewpoint, either or both the first insulating layer and second insulating layer preferably comprise one or more selected from the group consisting of polyolefins, polyphenylene ethers, polysulfones, polyethersulfones, polyphenylene sulfides, polyetherimides, polyamideimides, polyamides, polyesters, and the inorganic particles mentioned above.

Separator Production Method and Physical Properties

The method for producing the separator of embodiment 1 is not particularly restricted, and it may be any of the following methods (i) to (iii):

(i) A method in which the material (A) described above, the conducting material (B) described above, and optionally a molding precursor comprising the resin described above, are molded by dispersion, heating, melt kneading, extrusion, stretching, relaxation, etc. to obtain a single-layer separator;

(ii) A method in which the material (A) described above, the conducting material (B) described above, and optionally the resin described above are dissolved or dispersed in a solvent and the resulting dispersion is applied to at least one side of an insulating layer to obtain a separator with a layered structure; and (iii) A method in which the materials (A) and (B) and a resin are heated and mixed with an extruder, together with a plasticizer if necessary, and co-extruded with the constituent material of an insulating layer while the extruded layered sheet is provided for molding, stretching or plasticizer extraction and dried, to obtain a separator with a layered structure, or an insulating layer is further applied onto the surface of the active layer of the separator with a layered structure (ii) to obtain a separator.

The method for producing the multilayered separator of embodiment 2 or 3 is also not particularly restricted, and it may be any of the following methods (iv) and (v):

(iv) A method in which the material (A) that is able to occlude lithium described above and the resin described above are dissolved or dispersed in a solvent to obtain a resin solution (dispersion) of the material (A), and the dispersion is applied to at least one side of an insulating layer to obtain a layered separator, after which a slurry that is to form an insulating layer is further applied to the layered separator so as to produce a multilayered separator; and (v) A method in which the material (A) that is able to occlude lithium described above and the resin described above are heated and mixed with an extruder, together with a plasticizer if necessary, and co-extruded with the constituent material for an insulating layer, while the extruded layered sheet is supplied to molding, stretching or plasticizer extraction and dried to produce a multilayered separator.

A separator with a layered structure can also be produced using any method different from the production methods described above. For example, methods of combining an insulating layer and an active layer by lamination may be combined as appropriate with the above-described methods.

The solvent used is preferably a solvent in which the material (A) and the resin can uniformly and stably dissolve and disperse. Examples of such solvents include N-methylpyrrolidone, N,N-dimethylformamide, N,N-dimethylacetamide, water, ethanol, toluene, thermal xylene and hexane.

In order to stabilize the resin solution containing the material (A) that is able to occlude lithium, or in order to improve the coatability onto the insulating layer, the dispersion of the material (A) may have various additives added, such as a surfactant or other dispersing agent, or a thickener, moistening agent or antifoaming agent, or a pH regulator containing an acid or alkali. These additives are preferably ones that can be removed during solvent removal or during plasticizer extraction, but they may also remain in the battery (or the separator in the battery) so long as they are electrochemically stable, do not interfere with the battery reaction when the lithium ion secondary battery is used, and are stable up to about 200° C.

The method of dissolving or dispersing the material (A), the resin and optionally the conducting material (B) in the solvent may be, for example, a mechanical stirring method using a ball mill, bead mill, planetary ball mill, vibrating ball mill, sand mill, colloid mill, attritor, roll mill, high-speed impeller disperser, disperser, homogenizer, high-speed impact mill, ultrasonic disperser or stirring blade.

The method of applying the dispersion of material (A) or the dispersion of material (A) and material (B) onto the surface of the insulating layer is not particularly restricted so long as it capable of creating the prescribed layer thickness or application area. Examples of such application methods include gravure coater methods, small-diameter gravure coater methods, reverse roll coater methods, transfer roll coater methods, kiss coater methods, dip coater methods, knife coater methods, air doctor coater methods, blade coater methods, rod coater methods, squeeze coater methods, cast coater methods, die coater methods, screen printing methods and spray coating methods. The dispersion may be applied onto only one side of the insulating layer or onto both sides, depending on the purpose of use, but the outermost surface that is to contact with the electrodes is preferably an insulating layer from the viewpoint of inhibiting dendrite generation and short circuiting and increasing the charge-discharge capacity.

The solvent is preferably one that can be removed from the dispersion that has been applied to the insulating layer. The method of removing the solvent is not particularly restricted so long as it does not adversely affect the insulating layer. For example, the method of removing the solvent may be a method in which the insulating layer is anchored while drying it at a temperature below the melting point of the insulating layer, a method in which the insulating layer is dried under reduced pressure at a lower temperature than the boiling point of the solvent, or a method in which the resin is immersed in a poor solvent to coagulate the resin while simultaneously extracting the solvent.

The membrane thickness (total layer thickness) of the single-layer or layered separator is preferably 2 µm or greater, more preferably 5 µm or greater and even more preferably 7 µm or greater as the lower limit, and preferably no greater than 200 µm, more preferably no greater than 100 µm, even more preferably no greater than 50 µm and yet more preferably no greater than 30 µm, as the upper limit. The membrane thickness is preferably adjusted to 2 µm or greater from the viewpoint of ensuring adequate mechanical strength. On the other hand, the membrane thickness is also preferably adjusted to no greater than 200 µm from the viewpoint of allowing the volume occupied by the separator to be reduced and for high capacitance of the battery.

The percentage of the active layer thickness of the separator thickness (total layer thickness) in the layered separator is preferably 10% or greater and more preferably 20% or greater as the lower limit, and preferably no greater than 60% and more preferably no greater than 50% as the upper limit. The percentage is preferably adjusted to 10% or greater from the viewpoint of the dendrite-inhibiting effect, of increasing the short-circuit temperature and of achieving satisfactory heat resistance, while it is preferably adjusted to no greater than 50% from the viewpoint of suppressing reduction in the permeability of the separator.

In the layered separator, the interlayer peel strength is preferably 50 N/m or greater. If the interlayer peel strength is 50 N/m or greater then the handling property will tend to be improved when the separator is wound onto a reel, or during winding fabrication of an electricity storage device. By bonding the layers with a peel strength of 50 N/m or greater, the heat shrinkage factor when the layered separator has been heated will tend to be satisfactory since it will be maintained as the heat shrinkage factor of the highly heat resistant layer. The interlayer peel strength is more preferably 100 N/m or greater and even more preferably 200 N/m or greater.

The air permeability of the single-layer or layered separator is preferably 10 seconds/100 ml or greater, more preferably 20 seconds/100 ml or greater, even more preferably 30 seconds/100 ml or greater and most preferably 50 seconds/100 ml or greater, as the lower limit. The upper limit for the air permeability is preferably no greater than 650 seconds/100 ml, more preferably no greater than 500 seconds/100 ml, even more preferably no greater than 450 seconds/100 ml and most preferably no greater than 400 seconds/100 ml. Setting the air permeability to 10 seconds/100 ml or greater is preferable from the viewpoint of inhibiting self-discharge when the separator has been used in a battery. Setting the air permeability to no greater than 650 seconds/100 ml is preferable from the viewpoint of obtaining a satisfactory charge-discharge characteristic.

The heat shrinkage factor at 150° C. or the heat shrinkage factor at 130° C. of the single-layer or layered separator is preferably 0% to 15%, more preferably 0% to 10% and most preferably 0% to 5%. Adjusting the heat shrinkage factor to no greater than 15% is preferred from the viewpoint of satisfactorily preventing membrane rupture of the separator even during periods of abnormal heat release in the electricity storage device, and of inhibiting contact between the positive and negative electrodes (that is, from the viewpoint of achieving more satisfactory safety performance). The heat shrinkage factor is preferably set to within this range in both the machine direction (MD) and transverse direction (TD) of the separator. Depending on the stretching conditions, shrinkage may occur on one axis while slight elongation occurs on the axis perpendicular to it, in which case the shrinkage factor may exhibit a negative value. Since inhibiting shrinkage of the separator is associated with reduced short circuiting between the electrodes, it is important for the shrinkage factor to be below a constant value, whereas the shrinkage factor may be a negative value.

The lower limit for the shutdown temperature of the single-layer or layered separator is preferably 120° C. or higher, and the upper limit is preferably no higher than 160° C. and preferably no higher than 150° C. The shutdown temperature is the temperature at which the micropores of the separator become obstructed by heat-fusion when the electricity storage device has undergone abnormal heat release. Adjusting the shutdown temperature to no higher than 160° C. is preferred from the viewpoint of rapidly promoting current cutoff even when the electricity storage device has undergone heat release, thus obtaining more satisfactory safety performance. Adjusting the shutdown temperature to 120° C. or higher, on the other hand, is preferred from the viewpoint of allowing use at high temperatures of around 100° C., for example, or the viewpoint of allowing different types of heat treatment to be carried out.

The lower limit for the short-circuit temperature of the single-layer or layered separator is preferably 180° C. or higher and more preferably 200° C. or higher, and the upper limit is preferably no higher than 1000° C. Adjusting the short-circuit temperature to 180° C. or higher is preferred from the viewpoint of inhibiting contact between the positive and negative electrodes until the heat during abnormal heat release of the electricity storage device dissipates, thus obtaining more satisfactory safety performance.

The air permeability, membrane thickness, heat shrinkage factor, shutdown temperature and short-circuit temperature of the separator referred to above can be measured by the measuring methods described in the Examples below.

In a withstand voltage measurement test of the single-layer or layered separator, the voltage value at short circuiting is preferably 0.3 kV to 4.5 kV and more preferably 0.3 to 2.5 kv. If the voltage value is 0.3 kV or higher, it will be possible to reduce the rate of defects caused by short circuiting of the battery, and if the voltage value is no higher than 4.5 kV, it will be possible to increase the energy density of the battery.

Electricity Storage Device

The electricity storage device according to another embodiment of the invention comprises a positive electrode, the separator described above, a negative electrode and optionally an ion conductive medium. When the separator with a layered structure includes an insulating layer comprising inorganic particles, the insulating layer comprising the inorganic particles is preferably disposed so as to be in contact with at least a portion of the negative electrode surface of the electricity storage device, from the viewpoint of the rate characteristic and safety of the electricity storage device. The ion conductive medium may be in liquid form, gel form or solid form, depending on the electrolyte of the electricity storage device. From the viewpoint of high cycling properties and safety, the negative electrode potential (vsLi$^+$/Li) during charge of the electricity storage device is preferably lower than the potential (vsLi$^+$/Li) of the material (A) that is able to occlude lithium (Li) described above.

The positive electrode, negative electrode and separator are preferably disposed so that at least one insulating layer is present between the positive electrode and the separator and/or between the negative electrode and the separator, from the viewpoint of safety, capacity characteristics, output characteristics and cycle characteristics of the electricity storage device. Such a configuration can be produced by using a separator having a layered structure with an active layer inserted between a plurality of insulating layers, for example, or by providing the insulating layer described above as a constituent element of the separator, separate from the separator, between the electrodes and separator.

Specifically, the electricity storage device may be a lithium battery, lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel hydrogen battery, nickel cadmium battery, electrical double layer capacitor, lithium ion capacitor, redox flow battery, lithium sulfur battery, lithium-air battery, or zinc air battery, for example. Preferred among these, from the viewpoint of practicality, are a lithium battery, lithium secondary battery, lithium ion secondary battery, nickel hydrogen battery or lithium ion capacitor, with a lithium battery or lithium ion secondary battery being more preferred.

In the case of a lithium battery, lithium secondary battery, lithium ion secondary battery or lithium ion capacitor, the ion conductive medium is preferably a lithium (Li)-conducting medium.

The electricity storage device can be fabricated, for example, by stacking a positive electrode and a negative electrode across a separator according to the embodiment, winding it if necessary, to form a stacked electrode body or wound electrode body, and then loading it into an exterior body, connecting the positive and negative electrodes and the positive and negative electrode terminals of the exterior body via leads or the like, further injecting an ionic conductor into the exterior body, and sealing the exterior body. In the case of a lithium battery, lithium secondary battery, lithium ion secondary battery or lithium ion capacitor, the Li-conducting medium may be a nonaqueous electrolyte solution comprising a nonaqueous solvent of a chain or cyclic carbonate and an electrolyte such as a lithium salt, or a solid electrolyte or gel electrolyte.

EXAMPLES

The present embodiment will now be explained in greater detail by examples and comparative examples, with the understanding that the invention is not limited to the examples so long as its gist is maintained. The physical properties in the examples were measured by the following methods.

(1) Viscosity-Average Molecular Weight (Mv)

The limiting viscosity [η](dl/g) at 135° C. in a decalin solvent was determined based on ASTM-D4020. The Mv of polyethylene was calculated by the following formula.

$$[\eta]=6.77\times10^{-4}Mv^{0.67}$$

For polypropylene, the Mv was calculated by the following formula.

$$[\eta]=1.10\times10^{-4}Mv^{0.80}$$

(2) Thickness (μm)

Sample membrane thicknesses were measured with a dial gauge (PEACOCK No. 25™ by Ozaki Manufacturing Co., Ltd.). An MD10 mm×TD10 mm sample was cut out from the porous membrane and the thickness was measured at 9 locations of a lattice (3×3 points). The average of the obtained measured values was calculated as the membrane thickness (μm) or layer thickness.

The thickness of each single layer for the Examples and Comparative Examples was measured for the single layer obtained in each production step. For laminates, it was calculated by subtracting the measured single-layer value. For those where a single-layer state could not be obtained by co-extrusion, the thickness of each layer was calculated based on cross-sectional SEM.

(3) Air Permeability (sec/100 ml)

This was measured using a Gurley air permeability tester (G-B2™ by Toyo Seiki Co., Ltd.), according to JIS P-8117.

(4) Peel Strength (N/m)

The peel strength was measured in an environment of 25° C. using a tensile tester (autograph AG-IS) by Shimadzu Corp.

The separator was cut to a size of 2.5 cm×10 cm and the base material side was anchored to a glass plate with double-sided tape (NICETACK NWBB-15 by Nichiban Co., Ltd.), after which CELLOTAPE® by (Scotch 810-3-12) 3M Corp. was attached to the porous layer or adhesive layer. Approximately 5 mm at the edge of the attached tape was peeled off, and the tape side was placed on the top side (tension side) of the tensile tester while the base material side was placed on the bottom side (anchoring side) of the tensile tester, and the integrated average load while pulling in the direction 180° with respect to the surface of the porous layer at a speed of 100 mm/min was recorded as the peel strength.

(5) Porosity (%)

A 10 cm×10 cm square sample was cut out from the polyolefin microporous membrane, and its volume (cm³) ands weight (g) were determined and used for calculation together with the true density (g/cm³), using the following formula.

Porosity (%)=(Volume−(weight/true density of mixed composition))/volume×100

The density value used for the mixed composition was the value determined by calculation from the densities of the polyolefin resin and inorganic particles used and their mixing ratio.

(6) Mean Pore Size (μm), Number of Pores (num./μm²)

It is known that a fluid inside a capillary follows a Knudsen flow when the mean free path of the fluid is larger than the pore size of the capillary, and a Poiseuille flow when it is smaller. It is thus theorized that the flow of air during measurement of the air permeability of a microporous membrane follows a Knudsen flow, while the flow of water during measurement of the water permeability of a microporous membrane follows a Poiseuille flow.

In this case, the pore size d (μm) and curvature τ (dimensionless) can be calculated by the following formula, from the permeation rate constant for air $R_{gas}$ (m³/(m²·sec·Pa)), the permeation rate constant for water $R_{liq}$ (m³/(m²·sec·Pa)), the molecular speed of air ν (m/sec), the viscosity of water η (Pa·sec), standard pressure $P_s$ (=101,325 Pa), the porosity ε (%) and the membrane thickness L (μm).

$$d=2\nu\times(R_{liq}/R_{gas})\times(16\eta/3Ps)\times10^6$$

$$\tau=(d\times(\varepsilon/100)\times\nu/(3L\times P_s\times R_{gas}))^{1/2}$$

$R_{gas}$ in these formulas is calculated from the air permeability (sec) using the following formula.

$$R_{gas}=0.0001/(\text{air permeability}\times(6.424\times10^{-4})\times(0.01276\times101325))$$

Also, $R_{liq}$ is calculated from the water permeability (cm³/(cm²·sec·Pa)) using the following formula.

$$R_{liq}=\text{Water permeability}/100$$

The water permeability is determined in the following manner. The microporous membrane that has been immersed beforehand in alcohol is set in a stainless steel permeable cell with a diameter of 41 mm, and after washing the alcohol of the membrane with water, water is permeated through at a differential pressure of about 50,000 Pa and the water permeation per unit time, unit pressure and unit area is calculated from the water permeation (cm³) after elapse of 120 sec, and recorded as the water permeability.

In addition, ν was calculated using the following formula, from the gas constant R (=8.314), the absolute temperature T (K), the circular constant π and the average molecular weight of air M (=2.896×10⁻² kg/mol).

$$\nu=((8R\times T)/(\pi\times M))^{1/2}$$

The number of pores B (num./μm²) was also determined by the following formula.

$$B=4\times(\varepsilon/100)/(\pi\times d^2\times\tau)$$

The mean pore size and number of pores of the insulating layers (I) obtained in the Examples and Comparative Examples may be measured while in the state of the single layers obtained in each of the production steps.

The methods for measuring the mean pore size and number of pores of the insulating layer (I) for a layered separator is not particularly restricted, and examples include a method of measurement after detaching the layers with CELLOPHANE® tape to obtain the single layers, and a method of detaching the layers by impact with ultrasonic waves in a good solvent that is able to dissolve the binders of the layers that are not to be measured, thereby obtaining the single layers.

(7) Mean Particle Diameter (μm)

A 10 μm×10 μm visual field, magnified with a scanning electron microscope (SEM), was read into an image analyzer either directly or after burning onto a photograph with a negative, and the number-average value of the circle-equivalent diameter (the diameter of a circle drawn to encircle the same area as the particle) of each of the particles to be calculated was recorded as the mean particle diameter (μm). For unclear particle boundaries being inputted into the image analyzer from the photograph, the photograph was traced and the traced drawing was used for input into the image analyzer. Unless otherwise specified, the "mean particle diameter" referred to in the Examples is that measured using a scanning electron microscope (SEM).

The circle-equivalent diameter is calculated using the minimal unit particle that cannot be further loosened without applying excessive force. For example, the circle-equivalent diameter of a particle generally means the circle-equivalent diameter of a primary particle, but for particles that cannot be loosened without applying excessive force, such as granulated particles, it means the circle-equivalent diameter of the secondary particle. When primary particles are bound by weak force to form an amorphous structure, it means the circle-equivalent diameter of the primary particle diameters of the particle.

When it is difficult to determine the mean particle diameter of a sample by SEM, the measurement may be conducted using a laser particle diameter distribution analyzer. In this case, the sample may be dispersed for 1 minute with an ultrasonic homogenizer after addition of a small amount of aqueous sodium hexametaphosphate in addition to distilled water, and then a laser particle diameter distribution analyzer (Microtrac MT3300EX by Nikkiso Co., Ltd.) may be used to measure the particle diameter distribution, and the number-average value for the particles obtained as the mean particle diameter of the inorganic filler.

(8) Withstand Voltage

The porous membrane or multilayered porous membrane was sandwiched between 4 cm-diameter aluminum electrodes, a 15 g load was applied, and the stack was connected to a withstand voltage meter (TOS9201) by Kikusui Electronics Corp. for measurement. The average of 50 measured points was obtained as the measured value for the sample. As the measuring conditions, an alternating current voltage (60 Hz) was applied to the sample at a speed of 1.0 kV/sec and the voltage value at short circuiting was obtained as the withstand voltage (kV) of the porous membrane or multilayered porous membrane.

(9) Bulk Density of Inorganic Filler (g/cm³)

The heavy bulk density was measured by the method of JIS R-9301-2-4.

(10) Volume Fraction of Resin Binder (%)

The volume fraction (%) of the resin binder was calculated by the following formula.

$Vb=\{(Wb/db)/(Wb/db+Wf/Df)\} \times 100$

Vb: Volume fraction of resin binder (%)
Wb: Weight of resin binder (g)
Wf: Weight of inorganic filler (g)
db: Density of resin binder (g/cm³)
Df: Bulk density of inorganic filler (g/cm³)

(11) MD Maximum Thermal Shrinkage Stress (g), TD Maximum Thermal Shrinkage Stress (g)

The heat shrinkage of the sample was measured using a TMA50™ by Shimadzu Corp. When measuring the value in the MD (TD) direction, the sample cut out to a width of 3 mm in the TD (MD) is anchored to chucks with a distance of 10 mm between the chucks, and set in a dedicated probe. With an initial load of 1.0 g and in fixed-length measuring mode, the sample was heated from 30° C. to 200° C. at a temperature-elevating rate of 10° C./min, the load (g) generated at that times was measured, and the maximum was recorded as the MD (or TD) maximum thermal shrinkage stress (g).

(12) 150° C. Heat Shrinkage Factor, 130° C. Heat Shrinkage Factor

The separator was cut out to 100 mm in the MD direction and 100 mm in the TD direction, and allowed to stand for 1 hour in an oven at a prescribed temperature (150° C. or 130° C.). During this time, the sample was sandwiched between two sheets of paper so as to avoid direct contact of the sample with warm air. After removing the sample from the oven and cooling it, the length (mm) was measured and the MD and TD heat shrinkage factors were calculated by the following formulas.

MD heat shrinkage factor (%)={(100−MD length after heating)/100}×100

TD heat shrinkage factor (%)={(100−TD length after heating)/100}×100

(13) Electrical Resistivity

The separator was cut out into a strip of size 11.0 cm in the MD direction and 0.50 cm in the TD direction, and using an LCR meter, two terminals were contacted at two points on the surface of the active layer, at a section 0.5 cm in the MD direction and 0.25 mm in the TD direction and a section 10.5 cm in the MD direction and 0.25 mm in the TD direction, from the lengthwise end of the strip, to measure the resistance.

Incidentally, in the case of a separator that has been produced by simultaneously extruding 3 layers, and that has the active layer exposed and cannot be measured, the active layer can be exposed for measurement by detaching the surface layer with CELLOPHANE® tape or by cutting diagonally from the surface using a diagonal cutting device (SAICAS).

The electrical resistivity was calculated by the following formula.

Electrical resistivity (Ωcm)=measured value with LCR meter (Ω)×0.5 (cm: TD direction width)×active layer thickness (cm)/distance between two terminals (cm)

The active layer thickness was confirmed by cross-sectional SEM of the separator.

(14) Shutdown Temperature and Short-Circuit Temperature a. Fabrication of Positive Electrode A slurry is prepared by dispersing 92.2 weight % of lithium cobalt composite oxide (LiCoO₂) as a positive electrode active material, 2.3 weight % each of scaly graphite and acetylene black as conductive materials and 3.2 weight % of polyvinylidene fluoride (PVDF) as a binder in N-methylpyrrolidone (NMP). The slurry is applied using a die coater to one side of a 20 μm-thick aluminum foil as the positive electrode collector, and dried at 130° C. for 3 minutes, after which it is compression molded using a roll press. During this time, the active material coating amount on the positive electrode is 125 g/m² and the active material bulk density is 3.00 g/cm³.

b. Fabrication of Negative Electrode

A slurry is prepared by dispersing 96.6 weight % of artificial graphite as a negative electrode active material, 1.4 weight % of carboxymethyl cellulose ammonium salt as a binder and 1.7 weight % of styrene-butadiene copolymer latex in purified water. The slurry is applied using a die coater to one side of a 12 μm-thick copper foil as the negative electrode collector, and dried at 120° C. for 3 minutes, after which it is compression molded using a roll press. During this time, the active material coating amount on the negative electrode is 53 g/m² and the active material bulk density is 1.35 g/cm³.

c. Nonaqueous Electrolyte Solution

This is prepared by dissolving $LiBF_4$ as a solute in a mixed solvent of propylene carbonate:ethylene carbonate:γ-butyrolactone=1:1:2 (volume ratio) to a concentration of 1.0 mol/L.

d. Evaluation

A negative electrode cut out to 65 mm×20 mm and immersed for at least 1 minute in a nonaqueous electrolyte solution is set on a ceramic plate connected to a thermocouple, a 9 μm-thick aramid film cut out to 50 mm×50 mm and having a 16 mm-diameter hole cut at the center section is placed over it, a porous membrane of the sample cut out to 40 mm×40 mm and immersed for at least 1 hour in a nonaqueous electrolyte solution is placed so as to cover the hole of the aramid film, a positive electrode cut out to 65 mm×20 mm and immersed for at least 1 minute in a nonaqueous electrolyte solution is placed over this without contacting the negative electrode, and then a Kaptone film and additionally silicon rubber with a thickness of about 4 mm are placed over this. After setting it on a hot plate, the temperature was increased at a rate of 15° C./min while applying a pressure of 4.1 MPa using a hydraulic press, and the change in impedance between the positive and negative electrodes during this time was measured from a preset temperature of 25° C. to 200° C. under conditions with an alternating current of 1 V, 1 kHz. For the measurement, the shutdown temperature was recorded as the temperature when the impedance reached 1,000Ω, and the short-circuit temperature was recorded as the temperature at which the impedance fell below 1000Ω after having reached a state with the holes obstructed.

(15) Evaluation of Basic Battery Properties a. Fabrication of Positive Electrode The positive electrode fabricated in (14) a was punched out to a circle with an area of 2.00 cm².

b. Fabrication of Negative Electrode

The negative electrode fabricated in (14)b was punched out to a circle with an area of 2.05 cm².

c. Nonaqueous Electrolyte Solution

This was prepared by dissolving $LiPF_6$, as a solute, in a mixed solvent of ethylene carbonate:ethyl methyl carbonate=1:2 (volume ratio) to a concentration of 1.0 mol/L.

d. Evaluation of Battery Assembly

A negative electrode, separator and positive electrode are stacked in that order in the vertical direction, with the active material sides of the positive electrode and negative electrode facing each other, and housed in a stainless steel metal container with a cover. The container and cover are insulated, with the container in contact with the copper foil of the negative electrode and the cover in contact with the aluminum foil of the positive electrode. The container interior is injected with the nonaqueous electrolyte solution prepared in (15)c and sealed.

Each simple battery assembled as described above was subjected to initial charging following battery fabrication, for a total of about 6 hours, by a method of charge to a cell voltage of 4.2 V at a current value of 0.3 mA (about 0.1 C) in a 25° C. atmosphere and further beginning to narrow the current value from 0.3 mA while maintaining 4.2 V, and then to discharge up to a cell voltage of 3.0 V at a current value of 0.3 mA. The discharge capacity during this time was evaluated on the following scale, as the initial discharge capacity.

[Evaluation Ranking]

S: ≥150 mA/g

A: >140 mA/g and <150 mA/g

B: ≤140 mA/g

Next, the battery was subjected to charge for a total of about 3 hours, by a method of charge to a cell voltage of 4.2 V at a current value of 3 mA (about 1.0 C) in a 25° C. atmosphere and further beginning to narrow the current value from 3 mA while maintaining 4.2 V, and then to discharge up to a cell voltage of 3.0 V at a current value of 3 mA, obtaining the discharge capacity at that time as the 1 C discharge capacity (mAh).

Next, the battery was subjected to charge for a total of about 3 hours, by a method of charge to a cell voltage of 4.2 V at a current value of 3 mA (about 1.0 C) in a 25° C. atmosphere and further beginning to narrow the current value from 3 mA while maintaining 4.2 V, and then to discharge up to a cell voltage of 3.0 V at a current value of 30 mA (about 10.0 C), obtaining the discharge capacity at that time as the 10 C discharge capacity (mAh).

The ratio of the 10 C discharge capacity with respect to the 1 C discharge capacity was calculated and the value was evaluated on the following scale as the rate characteristic.

$$\text{Rate characteristic (\%)} = (10 \text{ C discharge capacity}/1 \text{ C discharge capacity}) \times 100$$

[Evaluation Ranking]

S: ≥50%

A: >30% and <50%

B: ≤30%

The battery was also subjected to a repeated cycle of charging for a total of about 3 hours, by a method of charge to a cell voltage of 4.2 V at a current value of 3 mA (about 1.0 C) in a 60° C. atmosphere and further beginning to narrow the current value from 3 mA while maintaining 4.2 V, and then discharge up to a cell voltage of 3.0 V at a current value of 3 mA.

The ratio of the discharge capacity after 300 cycles with respect to the discharge capacity at the first cycle was calculated as the capacity retention (%), and the cycle characteristic was evaluated on the following scale.

[Evaluation Ranking]

S: ≥50%

A: >30% and <50%

B: ≤30%

(16) Battery Safety Evaluation

<Dendrite Short Circuiting Test (A)>

A cell was fabricated in the same manner as (15) above, except that the positive electrode and negative electrode in the cell fabricated in (15) were changed to metal lithium (Li).

Dendrites were generated by dissolution and deposition of Li in the cell using metal Li as the positive and negative electrodes assembled as described above, by repeating a step of applying current flow for 10 minutes in the order: 2 mA/cm², 5 mA/cm², 10 mA/cm², 17 mA/cm², 25 mA/cm² and resting for 10 minutes, and the voltage was monitored to confirm the current value at which short circuiting occurred. Short circuiting was assessed when 10 or more discontinuous points were confirmed to have voltage fluctuation of Δ0.025 V, or when the voltage was completely 0 V. The test results were evaluated on the following scale.

[Evaluation Ranking]
  S: No short circuiting
  A: Short circuiting at 25 mA/cm²
  B: Short circuiting at 17 mA/cm²
  C: Short circuiting at 10 mA/cm²
  D: Short circuiting at 5 mA/cm²
  E: Short circuiting at 2 mA/cm²

<Dendrite Short Circuiting Test (B)>

A cell was fabricated in the same manner as the dendrite short circuiting test (A). Dendrites were generated by dissolution and deposition of Li in the cell, by continuing current flow of 15 mA/cm² for 2 hours, and the voltage was monitored to confirm the time until short circuiting occurred. Short circuiting was assessed when 10 or more discontinuous points were confirmed to have voltage fluctuation of Δ0.025 V, or when the voltage was completely 0 V. The test results were evaluated on the following scale.

[Evaluation Ranking]
  S: No short circuiting
  A: Short circuiting at 1 to 2 hours
  B: Short circuiting at 15 to 60 minutes
  C: Short circuiting within 15 minutes

(17) Nail-Penetration Test (A)

<Fabrication of Laminated Battery Stack>
<Fabrication of Positive Electrode>

There were uniformly mixed: a mixed positive electrode active material comprising lithium nickel manganese cobalt composite oxide powder ($LiNi_{1/3}Mn_{1/3}Co_{1/3}O_2$) and lithium manganese composite oxide powder ($LiMn_2O_4$), mechanically mixed at a weight ratio of 70:30, as a positive electrode active material: 85 parts by weight, acetylene black as a conductive aid: 6 parts by weight, and PVdF as a binder: 9 parts by weight, with N-methyl-2-pyrrolidone (NMP) as the solvent, to prepare a positive electrode mixture-containing paste. Both sides of a 20 μm-thick current collector made of aluminum foil were evenly coated with the positive electrode mixture-containing paste and dried, and thereafter, were compression-molded with a roll press, adjusting the thickness of the positive electrode mixture layer to a total thickness of 130 μm. A positive electrode was fabricated having a non-active material-coated aluminum foil with a length of 20 mm set as a lead tab on a short side top section of a rectangular sheet with 95 mm short sides and 120 mm long sides.

Fabrication of Negative Electrode

Graphite as a negative electrode active material: 91 parts by weight and PVdF as a binder: 9 parts by weight were mixed to uniformity with NMP as the solvent, to prepare a negative electrode mixture-containing paste. Both sides of a 15 μm-thick current collector made of copper foil were evenly coated with the negative electrode mixture-containing paste and dried, and thereafter, were compression-molded with a roll press, adjusting the thickness of the negative electrode mixture layer to a total thickness of 130 μm.

A negative electrode was fabricated having a non-active material-coated copper foil with a length of 20 mm set as a lead tab on a short side top section of a rectangular sheet with 95 mm short sides and 120 mm long sides.

Preparation of Nonaqueous Electrolyte Solution

A nonaqueous electrolyte solution was prepared by dissolving $LiPF_6$, as a solute, in a mixed solvent of ethylene carbonate:ethyl methyl carbonate:dimethyl carbonate=1:1:1 (volume ratio) to a concentration of 1.0 mol/L.

Fabrication of Cell

A electrode stack was fabricated by alternately stacking 3 positive electrode sheets and 4 negative electrode sheets, each separated by a separator. The separator was a separator strip with a width of 125 mm, which was alternately folded in a zig-zag form to fabricate the electrode stack.

After flat-pressing the electrode stack, it was housed in an aluminum laminate film and three of the sides were heat sealed. A positive electrode lead tab and negative electrode lead tab were drawn out from one side of the laminate film. After drying, the nonaqueous electrolyte solution was injected into the container and the remaining side was sealed.

Nail Penetration Evaluation

A laminate cell fabricated as described above was subjected to constant current, constant voltage (CCCV) charging over a period of 3 hours under conditions with a current value of 0.3 A and a final cell voltage of 4.2 V. The laminate cell was then placed on a steel sheet in an explosion-proof booth, and an iron nail with a diameter of 2.5 mm was penetrated through the center section of the cell at a speed of 3 mm/sec in an environment of about 25° C. The cell was visually observed and evaluated on the following scale.

[Evaluation Ranking]
  S: No change
  A: Gas effusion
  B: Ignition

(18) Nail-Penetration Test (B)

A nail-penetration test was conducted in the same manner as (18) above, except that the charging voltage for nail penetration evaluation was changed to 4.3 V.

<Test Series I>

Example 1

High-density polyethylene homopolymer with a Mv of 700,000, at 45 parts by weight,
high-density polyethylene homopolymer with a Mv of 300,000, at 45 parts by weight, and
polypropylene homopolymer with a Mv of 400,000, at 5 parts by weight, were dry blended using a tumbler blender.

To 99 parts by weight of the obtained polyolefin mixture there was added 1 part by weight of tetrakis-[methylene-(3', 5'-di-t-butyl-4'-hydroxyphenyl)propionate]methane as an antioxidant, and a tumbler blender was again used for dry blending to obtain a mixture.

The obtained mixture was supplied to a twin-screw extruder through a feeder, under a nitrogen atmosphere.

Also, liquid paraffin (kinematic viscosity at 37.78° C.: $7.59 \times 10^{-5}$ m²/s) was injected into the extruder cylinder by a plunger pump.

The operating conditions for the feeder and pump were adjusted for a liquid paraffin content of 65 parts by weight and a polymer concentration of 35 parts by weight in the total of 100 parts by weight of the mixture to be extruded.

The contents were then melt kneaded in the twin-screw extruder while heating to 200° C., the obtained melt kneaded mixture was extruded through a T-die onto a cooling roll controlled to a surface temperature of 80° C., and the extruded mixture was contacted with a cooling roll for casting and cooled to solidification to obtain a cast sheet with a thickness of 1170 µm.

The sheet was then stretched to MD 7 times×TD 6.4 times at 122° C. using a simultaneous biaxial stretcher, and the stretched sheet was immersed in methylene chloride for extraction removal of the liquid paraffin and then dried. The sheet was transversely stretched to a factor of 2.0 at 125° C. using a transverse stretcher, and then subjected to relaxation heat treatment at 128° C. to 1.8 times finally, to obtain a polyolefin microporous membrane. The obtained polyolefin microporous membrane was used as insulating layer (I). The cooled sheet thickness, the simultaneous biaxial stretching temperature, the transverse stretching factor and temperature and the relaxation heat treatment factor and temperature were adjusted to modify the thickness, pore size and number of pores of the resulting insulating layer (I).

Next, 90 parts by weight of flaky graphite, 5 parts by weight of carbon black, 5 parts by weight of an acrylic polymer latex (solid concentration: 40%, mean particle diameter: 145 nm, Tg=−10° C.), with 1.0 part by weight of an aqueous ammonium polycarboxylate solution (SN Dispersant 5468 by San Nopco, Ltd.) and 2.0 parts by weight of carboxymethyl cellulose (CMC) were evenly dispersed in 100 parts by weight of water to prepare a coating solution, and the coating solution was applied onto the insulating layer (I) by a gravure coater. The coating layer on the insulating layer (I) was dried at 60° C. to remove the water, forming a layer comprising a material capable of occluding lithium (active layer) to a thickness of 5 µm on the insulating layer (I) (insulating layer (I)+active layer).

Finally, using a heat laminator, the laminated body (insulating layer (I)+active layer) and the insulating layer (I) were layered and passed through a rubber roll set to 60° C., 0.2 MPa, to obtain a separator with a 3-layered structure.

Examples 2 and 3

Separators were fabricated in the same manner as Example 1, except that the weight ratio of the active layer material was adjusted to the values listed in Table 1.

Example 4

There were mixed 95 parts by weight of high-density polyethylene with a Mv of 300,000 and 5 parts by weight of polypropylene with a Mv of 400,000, as the starting materials for insulating layers (I) and (II), and 1 part by weight of tetrakis[methylene-3-(3',5'-di-t-butyl-4'-hydroxyphenyl) propionate]methane as an antioxidant, to prepare a first composition to form insulating layer (I) and insulating layer (II).

Using a Henschel mixer, 22.4 parts by weight of flaky graphite, 22.4 parts by weight of carbon black and 10.4 parts by weight of high-density polyethylene resin with a Mv of 700,000, as the starting material for the layer comprising the material capable of occluding lithium, 44.8 parts by weight of liquid paraffin as a plasticizer and 1 part by weight of tetrakis[methylene-3-(3',5'-di-t-butyl-4'-hydroxyphenyl) propionate]methane as an antioxidant, were pre-mixed to prepare a second composition to form the layer comprising the material capable of occluding lithium (active layer).

The first resin composition and second resin composition were respectively supplied by a feeder to respective feed ports of two twin-screw extruders, under a nitrogen atmosphere. Liquid paraffin (kinematic viscosity at 37.78° C.: $7.59 \times 10^{-5}$ m$^2$/s) was also injected into the twin-screw extruder cylinders by a plunger pump. Liquid paraffin was also side-fed to the twin-screw extruder cylinders to a plasticizer ratio of 55 weight % in the total extruded mixture from melt kneading of the first resin composition, and to a plasticizer ratio of 60 weight % in the total extruded mixture from melt kneading of the second resin composition.

The first and second resin compositions were then melt kneaded at 200° C., and each was passed through a gear pump set to a temperature of 200° C., a conduit and a T-die capable of co-extrusion of three layers of two different types, and cooled with a roll having a surface temperature of 80° C., to obtain a sheet-like composition comprising the insulating layer (I) and insulating layer (II) composed of the first composition, as the surface layers, and the active layer composed of the second composition as the interlayer.

The temperature and stretch factor of the sheet-like composition were then continuously adjusted with a simultaneous biaxial stretcher while stretching, after which the stretched sheet was immersed in methylene chloride for extraction removal of the liquid paraffin and then dried. The obtained sheet was subsequently subjected to transverse stretching and relaxation heat treatment to obtain a separator.

Examples 5 and 6

Separators were fabricated in the same manner as Example 4, except that the weight ratio of the active layer material was adjusted to the value listed in Table 1 or 2.

Example 7

Instead of layering the final insulating layer (I) and hot pressing as in Example 1, a coating solution was prepared by evenly dispersing 96.0 parts by weight of tabular aluminum hydroxide oxide (mean particle diameter: 1.0 µm) and 4.0 parts by weight of an acrylic polymer latex (solid concentration: 40%, mean particle diameter: 145 nm, Tg: −10° C.), with 1.0 part by weight of an aqueous ammonium polycarboxylate solution (SN Dispersant 5468 by San Nopco, Ltd.) in 100 parts by weight of water, and was applied to the layer comprising the material capable of occluding lithium (active layer) using a gravure coater. The coating layer on the active layer was dried at 60° C. to remove the water, to obtain a multilayered porous membrane having an insulating layer (II) with a thickness of 5 µm formed on the active layer. A battery was fabricated with the insulating layer (II) facing the negative electrode surface.

Example 8

A separator was obtained in the same manner as Example 7, except that the inorganic filler of the insulating layer (II) was changed to tabular aluminum silicate (mean particle diameter: 1.0 µm).

Example 9

A separator was obtained in the same manner as Example 8, except that the shape of the inorganic filler of the insulating layer (II) was changed to block-shaped (mean particle diameter: 1.0 µm).

Example 10

A separator was obtained in the same manner as Example 1, except that the scaly graphite listed in Table 2 was used instead of carbon black.

Examples 11 to 17

Separators were obtained in the same manner as Example 1, except that the number of layers, the structure of the active layer, the structure of the insulating layers (I) and (II) and the layer thicknesses were changed as shown in Table 3 or 4.

Example 18

A separator was obtained in the same manner as Example 4, except that the weight ratio of the active layer material was adjusted to the value listed in Table 4.

Example 19

A two-layered separator was obtained in the same manner as Example 18, except that the insulating layer (II) was not extruded. The battery was fabricated with the active layer facing the negative electrode surface.

Example 20

A single-layer separator was obtained in the same manner as Example 18, except that only the active layer was extruded, and the thickness was adjusted by adjusting the extrusion output.

Comparative Example 1

A single-layer separator was obtained in the same manner as Example 20, except that structure of the active layer was changed as shown in Table 5.

Comparative Example 2

A two-layered separator was obtained in the same manner as Example 1, except that the material of the active layer was adjusted to the weight ratio listed in Table 5, without including carbon black, and the step of layering of the insulating layer (I) and thermal lamination was omitted. The battery was fabricated with the active layer facing the negative electrode surface.

Comparative Example 3

A battery was fabricated using the separator of Comparative Example 2, with the active layer facing the positive electrode surface.

Comparative Example 4

The insulating layer (I) fabricated in Example 1 was used as a separator.

Comparative Example 5

A mixture of NMP, PVDF and graphite in a weight ratio of 50:5:1 was stirred for 10 hours to dissolve the PVDF in the NMP. The paste prepared in this manner was applied to a glass plate to a uniform thickness and then immersed in water to remove the NMP, thereby solidifying the PVDF to fabricate a PVDF membrane comprising graphite. Because the escape routes of NMP in the water form holes during solidification of the polymer, the formed membrane was a porous membrane having communicating pores. The membrane was vacuum dried at 65° C. for 10 hours to remove the water and obtain a porous membrane with a thickness of 20 μm. The porous membrane was pressed to obtain an active layer with a thickness of 10 μm, and was attached to one side of the insulating layer (I) obtained in Example 1 through a heat laminator (set to 60° C., 0.2 MPa), for use as a separator. The battery was fabricated with the active layer facing the negative electrode surface.

Comparative Example 6

The insulating layer (I) obtained in Example 1 was attached to the other side of the separator fabricated in Comparative Example 5 through a heat laminator (set to 60° C., 0.2 MPa) to obtain a separator having insulating layers (I) laminated on both sides of the active layer.

Comparative Example 7

Spherical titania, an acrylic polymer latex (solid concentration: 40%, mean particle diameter: 145 nm, Tg: −10° C.) and carboxymethyl cellulose (CMC) were mixed with water in a material weight ratio of 98:1:1 in terms of solid ratio, to prepare a coating material for a layer comprising a material capable of occluding lithium (active layer). The coating material was applied to one side of the insulating layer (I) obtained in Example 1 using a bar coater and dried at 60° C. to remove the water, thereby forming a 5 μm-thick layer comprising a material capable of occluding lithium (active layer).

Next, alumina, an acrylic polymer latex (solid concentration: 40%) and carboxymethyl cellulose (CMC) were mixed with water in a material weight ratio of 98:1:1 in terms of solid ratio, to prepare a coating material for the insulating layer (II). The coating material for the insulating layer (II) was applied onto the surface of the active layer obtained above using a bar coater and dried at 60° C. to remove the water, forming an insulating layer (II) with a thickness of 5 μm, thus obtaining a separator comprising an active layer as the interlayer.

Comparative Example 8

A separator was obtained in the same manner as Example 1, except that carbon black was not included in the active layer.

Comparative Example 9

An insulating layer (I) with the constitution shown in Table 6 was used as a single-layer separator.

Comparative Example 10

An active layer with the constitution shown in Table 6 was used as a single-layer separator.

TABLE 1

|  |  | Example 1 | Example 2 | Example 3 | Example 4 | Example 5 |
|---|---|---|---|---|---|---|
| Number of layers |  | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Graphite | Graphite |
|  | (1) Mean particle diameter (μm) | 4 | 4 | 4 | 4 | 4 |
|  | (1) Form | Flaky | Flaky | Flaky | Flaky | Flaky |
|  | (2) Conductive substance (B) | Carbon black | Carbon black | Carbon black | Carbon black | Carbon black |
|  | (2) Mean particle diameter (μm) | 0.08 | 0.08 | 0.08 | 0.08 | 0.08 |
|  | (3) Resin A | Acrylic | Acrylic | Acrylic | PE | PE |
|  | Weight ratio (1):(2):(3) | 90:5:5 | 5:90:5 | 42.5:42.5:5 | 22.4:22.4:10.4 | 10:10:80 |
|  | Particle diameter ratio (A)/(B) | 50.0 | 50.0 | 50.0 | 50.0 | 50.0 |
| B. Construction of insulating layer (I) not comprising material capable of occluding lithium | (4) Inorganic filler | — | — | — | — | — |
|  | (5) Resin B | PE, PP | PE, PP | PE, PP | PE, PP | PE, PP |
|  | Weight ratio (4):(5) | — | — | — | — | — |
| C. Construction of insulating layer (II) not comprising material capable of occluding lithium | (6) Inorganic filler | — | — | — | — | — |
|  | Inorganic filler form | — | — | — | — | — |
|  | (7) Resin C | PE, PP | PE, PP | PE, PP | PE, PP | PE, PP |
|  | Weight ratio (6):(7) | — | — | — | — | — |
| Thicknesses (μm) | A. layer | 5 | 5 | 5 | 5 | 5 |
|  | B. layer | 10 | 10 | 10 | 10 | 10 |
|  | C. layer | 10 | 10 | 10 | 10 | 10 |
|  | A. layer thickness % | 20 | 20 | 20 | 20 | 20 |
| Separator physical properties | Separator air permeability (s/100 ml) | 150 | 140 | 140 | 140 | 170 |
| Basic battery properties | Initial discharge capacity | S | S | S | S | S |
|  | Cycle characteristic | S | S | S | S | A |
| Battery safety | Dendrite short circuiting test (A) | S | A | S | S | A |
|  | Dendrite short circuiting test (B) | S | A | A | A | B |
|  | Nail penetration test (A) | S | A | S | S | S |

TABLE 2

|  |  | Example 6 | Example 7 | Example 8 | Example 9 | Example 10 |
|---|---|---|---|---|---|---|
| Number of layers |  | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Graphite | Graphite |
|  | (1) Mean particle diameter (μm) | 4 | 4 | 4 | 4 | 4 |
|  | (1) Form | Flaky | Flaky | Flaky | Flaky | Flaky |
|  | (2) Conductive substance (B) | Carbon black | Carbon black | Carbon black | Carbon black | Graphite |
|  | (2) Mean particle diameter (μm) | 0.08 | 0.08 | 0.08 | 0.08 | 0.7 |
|  | (3) Resin A | PE | Acrylic | Acrylic | Acrylic | Acrylic |
|  | Weight ratio (1):(2):(3) | 18.8:18.7:37.5 | 90:5:5 | 90:5:5 | 90:5:5 | 90:5:5 |
|  | Particle diameter ratio (A)/(B) | 50.0 | 50.0 | 50.0 | 50.0 | 5.7 |
| B. Construction of insulating layer (I) not comprising material capable of occluding lithium | (4) Inorganic filler | — | — | — | — | — |
|  | (5) Resin B | PE, PP | PE, PP | PE, PP | PE, PP | PE, PP |
|  | Weight ratio (4):(5) | — | — | — | — | — |
| C. Construction of insulating layer (II) not comprising material capable of occluding lithium | (6) Inorganic filler | — | Aluminum hydroxide oxide | Aluminum silicate | Aluminum silicate | — |
|  | Inorganic filler form | — | Tabular | Tabular | Block | — |
|  | (7) Resin C | PE, PP | Acrylic | Acrylic | Acrylic | PE, PP |
|  | Weight ratio (6):(7) | — | 96:4 | 96:4 | 96:4 | — |
| Thicknesses (μm) | A. layer | 5 | 5 | 5 | 5 | 5 |
|  | B. layer | 10 | 10 | 10 | 10 | 10 |
|  | C. layer | 10 | 5 | 5 | 5 | 10 |
|  | A. layer thickness % | 20 | 25 | 25 | 25 | 20 |
| Separator physical properties | Separator air permeability (s/100 ml) | 140 | 140 | 140 | 140 | 140 |
| Basic battery properties | Initial discharge capacity | S | S | S | S | S |
|  | Cycle characteristic | S | S | S | S | S |
| Battery safety | Dendrite short circuiting test (A) | S | S | S | S | S |
|  | Dendrite short circuiting test (B) | A | S | S | S | A |
|  | Nail penetration test (A) | S | S | S | S | S |

TABLE 3

|  |  | Example 11 | Example 12 | Example 13 | Example 14 | Example 15 |
|---|---|---|---|---|---|---|
| Number of layers |  | 3-Layered | 3-Layered | 3-Layered | 3-Layered | 3-Layered |
| A. Construction of layer comprising material capable of occluding lithium (active layer) | (1) Material (A) capable of occluding lithium | Graphite | Silicon | Silicon | Lithium titanate | Lithium titanate |
|  | (1) Mean particle diameter (μm) | 2 | 2 | 2 | 2 | 2 |
|  | (1) Form | Flaky | Block | Block | Spherical | Spherical |
|  | (2) Conductive substance (B) | Hard carbon | Hard carbon | Hard carbon | Hard carbon | Hard carbon |

TABLE 3-continued

|  |  | Example 11 | Example 12 | Example 13 | Example 14 | Example 15 |
|---|---|---|---|---|---|---|
|  | (2) Mean particle diameter (μm) | 1.5 | 1.5 | 0.8 | 1.5 | 0.8 |
|  | (3) Resin A | Acrylic | Acrylic | Acrylic | Acrylic | Acrylic |
|  | Weight ratio (1):(2):(3) | 90:5:5 | 90:5:5 | 90:5:5 | 90:5:5 | 90:5:5 |
|  | Particle diameter ratio (A)/(B) | 1.3 | 1.3 | 2.5 | 1.3 | 2.5 |
| B. Construction of insulating layer (I) not comprising material capable of occluding lithium | (4) Inorganic filler | — | — | — | — | — |
|  | (5) Resin B | PE, PP | PE, PP | PE, PP | PE, PP | PE, PP |
|  | Weight ratio (4):(5) | — | — | — | — | — |
| C. Construction of insulating layer (II) not comprising material capable of occluding lithium | (6) Inorganic filler | — | — | — | — | — |
|  | Inorganic filler form | — | — | — | — | — |
|  | (7) Resin C | PE, PP | PE, PP | PE, PP | PE, PP | PE, PP |
|  | Weight ratio (6):(7) | — | — | — | — | — |
| Thicknesses (μm) | A. layer | 5 | 5 | 5 | 5 | 5 |
|  | B. layer | 10 | 10 | 10 | 10 | 10 |
|  | C. layer | 10 | 10 | 10 | 10 | 10 |
|  | A. layer thickness % | 20 | 20 | 20 | 20 | 20 |
| Separator physical properties | Separator air permeability (s/100 ml) | 140 | 140 | 140 | 140 | 140 |
| Basic battery properties | Initial discharge capacity | S | S | S | S | S |
|  | Cycle characteristic | S | S | S | S | S |
| Battery safety | Dendrite short circuiting test (A) | A | A | A | A | A |
|  | Dendrite short circuiting test (B) | B | B | A | B | A |
|  | Nail penetration test (A) | S | S | S | S | S |

TABLE 4

|  |  | Example 16 | Example 17 | Example 18 | Example 19 | Example 20 |
|---|---|---|---|---|---|---|
| Number of layers |  | 3-Layered | 3-Layered | 3-Layered | 2-layered | Single layer |
| A. Construction of layer comprising material capable of occluding lithium (active layer) | (1) Material (A) capable of occluding lithium | Manganese(IV) oxide | Manganese(IV) oxide | Graphite | Graphite | Graphite |
|  | (1) Mean particle diameter (μm) | 2 | 2 | 4 | 4 | 4 |
|  | (1) Form | Block | Block | Flaky | Flaky | Flaky |
|  | (2) Conductive substance (B) | Hard carbon | Hard carbon | Carbon black | Carbon black | Carbon black |
|  | (2) Mean particle diameter (μm) | 1.5 | 0.8 | 0.08 | 0.08 | 0.08 |
|  | (3) Resin A | Acrylic | Acrylic | PE | PE | PE |
|  | Weight ratio (1):(2):(3) | 90:5:5 | 90:5:5 | 20:5:75 | 20:5:75 | 20:5:75 |
|  | Particle diameter ratio (A)/(B) | 1.3 | 2.5 | 50.0 | 50.0 | 50.0 |
| B. Construction of insulating layer (I) not comprising material capable of occluding lithium | (4) Inorganic filler | — | — | — | — | — |
|  | (5) Resin B | PE, PP | PE, PP | PE, PP | PE, PP | — |
|  | Weight ratio (4):(5) | — | — | — | — | — |
| C. Construction of insulating layer (II) not comprising material capable of occluding lithium | (6) Inorganic filler | — | — | — | — | — |
|  | Inorganic filler form | — | — | — | — | — |
|  | (7) Resin C | PE, PP | PE, PP | PE, PP | — | — |
|  | Weight ratio (6):(7) | — | — | — | — | — |
| Thicknesses (μm) | A. layer | 5 | 5 | 5 | 5 | 20 |
|  | B. layer | 10 | 10 | 10 | 10 | — |
|  | C. layer | 10 | 10 | 10 | — | — |
|  | A. layer thickness % | 20 | 20 | 20 | 33 | 100 |
| Separator physical properties | Separator air permeability (s/100 ml) | 140 | 140 | 160 | 140 | 120 |
| Basic battery properties | Initial discharge capacity | S | S | S | A | A |
|  | Cycle characteristic | S | S | S | A | B |
| Battery safety | Dendrite short circuiting test (A) | A | A | A | B | C |
|  | Dendrite short circuiting test (B) | B | A | B | B | C |
|  | Nail penetration test (A) | S | S | S | A | B |

TABLE 5

|  |  | Comp. Example 1 | Comp. Example 2 | Comp. Example 3 | Comp. Example 4 | Comp. Example 5 |
|---|---|---|---|---|---|---|
| Number of layers |  | Single layer | 2-layered | 2-layered | Single layer | 2-layered |
| A. Construction of layer comprising material capable of occluding lithium (active layer) | (1) Material (A) capable of occluding lithium | Graphite | Graphite | Graphite | — | Graphite |
|  | (1) Mean particle diameter (μm) | 4 | 4 | 4 | — | 4 |
|  | (1) Form | Flaky | Flaky | Flaky | — | Flaky |
|  | (2) Conductive substance (B) | — | — | — | — | — |
|  | (2) Mean particle diameter (μm) | — | — | — | — | — |
|  | (3) Resin A | PE | Acrylic | Acrylic | — | PVDF |
|  | Weight ratio (1):(2):(3) | 25:75 | 90:10 | 90:10 | — | 1:5 |
|  | Particle diameter ratio (A)/(B) | — | — | — | — | — |

TABLE 5-continued

|  |  | Comp. Example 1 | Comp. Example 2 | Comp. Example 3 | Comp. Example 4 | Comp. Example 5 |
|---|---|---|---|---|---|---|
| B. Construction of insulating layer (I) not comprising material capable of occluding lithium | (4) Inorganic filler | — | — | — | — | — |
|  | (5) Resin B | — | PE, PP | PE, PP | PE, PP | PE, PP |
|  | Weight ratio (4):(5) | — | — | — | — | — |
| C. Construction of insulating layer (II) not comprising material capable of occluding lithium | (6) Inorganic filler | — | — | — | — | — |
|  | Inorganic filler form | — | — | — | — | — |
|  | (7) Resin C | — | — | — | — | — |
|  | Weight ratio (6):(7) | — | — | — | — | — |
| Thicknesses (μm) | A. layer | 20 | 5 | 5 | — | 10 |
|  | B. layer | — | 10 | 10 | 10 | 10 |
|  | C. layer | — | — | — | — | — |
|  | A. layer thickness % | 100 | 33 | 33 | 0 | 50 |
| Separator physical properties | Separator air permeability (s/100 ml) | 120 | 100 | 100 | 70 | 220 |
| Basic battery properties | Initial discharge capacity | A | A | A | S | B |
|  | Cycle characteristic | C | B | A | B | B |
| Battery safety | Dendrite short circuiting test (A) | C | C | C | D | C |
|  | Dendrite short circuiting test (B) | C | C | C | C | C |
|  | Nail penetration test (A) | B | B | B | B | A |

TABLE 6

|  |  | Comp. Example 6 | Comp. Example 7 | Comp. Example 8 | Comp. Example 9 | Comp. Example 10 |
|---|---|---|---|---|---|---|
| Number of layers |  | 3-Layered | 3-Layered | 3-Layered | Single layer | Single layer |
| A. Construction of layer comprising material capable of occluding lithium (active layer) | (1) Material (A) capable of occluding lithium | Graphite | Titania | Graphite | — | Graphite |
|  | (1) Mean particle diameter (μm) | 4 | 2 | 4 | — | 4 |
|  | (1) Form | Flaky | Spherical | Flaky | — | Flaky |
|  | (2) Conductive substance (B) | — | — | — | — | — |
|  | (2) Mean particle diameter (μm) | — | — | — | — | — |
|  | (3) Resin A | PVDF | Acrylic | Acrylic | — | PE |
|  | Weight ratio (1):(2):(3) | 1:5 | 98:1 (:CMC 1) | 95:5 | — | 25:75 |
|  | Particle diameter ratio (A)/(B) | — | — | — | — | — |
| B. Construction of insulating layer (I) not comprising material capable of occluding lithium | (4) Inorganic filler | — | — | — | — | — |
|  | (5) Resin B | PE, PP | PE, PP | PE, PP | PE, PP | — |
|  | Weight ratio (4):(5) | — | — | — | — | — |
| C. Construction of insulating layer (II) not comprising material capable of occluding lithium | (6) Inorganic filler | — | Alumina | — | — | — |
|  | Inorganic filler form | — | Spherical | — | — | — |
|  | (7) Resin C | PE, PP | Acrylic | PE, PP | — | — |
|  | Weight ratio (6):(7) | — | 98:1 (:CMC 1) | — | — | — |
| Thicknesses (μm) | A. layer | 10 | 5 | 5 | — | 20 |
|  | B. layer | 10 | 10 | 10 | 10 | — |
|  | C. layer | 10 | 5 | 10 | — | — |
|  | A. layer thickness % | 33 | 25 | 20 | 0 | 100 |
| Separator physical properties | Separator air permeability (s/100 ml) | 280 | 120 | 150 | 680 | 680 |
| Basic battery properties | Initial discharge capacity | S | S | S | B | B |
|  | Cycle characteristic | B | B | A | B | B |
| Battery safety | Dendrite short circuiting test (A) | B | B | A | E | D |
|  | Dendrite short circuiting test (B) | B | B | B | C | C |
|  | Nail penetration test (A) | A | A | A | B | B |

<Test Series II>

Example 21

High-density polyethylene homopolymer with a My of 700,000, at 45 parts by weight,
high-density polyethylene homopolymer with a My of 300,000, at 45 parts by weight, and
polypropylene homopolymer with a My of 400,000, at 5 parts by weight, were dry blended using a tumbler blender.

To 99 parts by weight of the obtained polyolefin mixture there was added 1 part by weight of tetrakis-[methylene-(3', 5'-di-t-butyl-4'-hydroxyphenyl)propionate]methane as an antioxidant, and a tumbler blender was again used for dry blending to obtain a mixture.

The obtained mixture was supplied to a twin-screw extruder through a feeder, under a nitrogen atmosphere.

Also, liquid paraffin (kinematic viscosity at 37.78° C.: 7.59×10$^{-5}$ m$^2$/s) was injected into the extruder cylinder by a plunger pump.

The operating conditions for the feeder and pump were adjusted for a liquid paraffin content of 65 parts by weight and a polymer concentration of 35 parts by weight in the total of 100 parts by weight of the mixture to be extruded.

The contents were then melt kneaded in the twin-screw extruder while heating to 200° C., the obtained melt kneaded mixture was extruded through a T-die onto a cooling roll controlled to a surface temperature of 80° C., and the extruded mixture was contacted with a cooling roll for casting and cooled to solidification to obtain a cast sheet with a thickness of 1170 μm.

The sheet was then stretched to MD 7 times×TD 6.4 times at 122° C. using a simultaneous biaxial stretcher, and the stretched sheet was immersed in methylene chloride for extraction removal of the liquid paraffin and then dried. The sheet was transversely stretched to 2.0 times at 125° C. using a transverse stretcher, and then subjected to relaxation heat treatment at 128° C. to 1.8 times finally, to obtain a polyolefin microporous membrane. The obtained polyolefin microporous membrane was used as insulating layer (I). The cooled sheet thickness, the simultaneous biaxial stretching temperature, the transverse stretching factor and temperature and the relaxation heat treatment factor and temperature were adjusted to modify the thickness, pore size and number of pores of the resulting insulating layer (I).

Next, 90 parts by weight of flaky graphite, 10 parts by weight of an acrylic polymer latex (solid concentration: 40%, mean particle diameter: 145 nm, Tg=−10° C.), with 1.0 part by weight of an aqueous ammonium polycarboxylate solution (SN Dispersant 5468 by San Nopco, Ltd.) and 2.0 parts by weight of carboxymethyl cellulose (CMC) were evenly dispersed in 100 parts by weight of water to prepare a coating solution, and the coating solution was applied onto the insulating layer (I) by a gravure coater. The coating layer on the insulating layer (I) was dried at 60° C. to remove the water, forming a layer comprising a material capable of occluding lithium (active layer) to a thickness of 5 μm on the insulating layer (I) (insulating layer (I)+active layer).

Finally, using a heat laminator, the laminated body (insulating layer (I)+active layer) and the insulating layer (I) were layered and passed through a rubber roll set to 60° C., 0.2 MPa, to obtain a separator with a 3-layered structure.

Example 22

There were mixed 95 parts by weight of high-density polyethylene with a Mv of 300,000 and 5 parts by weight of polypropylene with a Mv of 400,000, as the starting materials for insulating layers (I) and (II), and 1 part by weight of tetrakis[methylene-3-(3',5'-di-t-butyl-4'-hydroxyphenyl) propionate]methane as an antioxidant, to prepare a first composition to form insulating layer (I) and insulating layer (II).

Using a Henschel mixer, 44.8 parts by weight of flaky graphite (81 weight % as the proportion in the total amount of resin and graphite), 10.4 parts by weight of high-density polyethylene resin with a Mv of 700,000 (19 weight % as the proportion of resin and graphite of the total amount), as the starting material for the layer comprising the material capable of occluding lithium, 44.8 parts by weight of liquid paraffin as a plasticizer and 1 part by weight of tetrakis [methylene-3-(3',5'-di-t-butyl-4'-hydroxyphenyl)propionate]methane as an antioxidant, were pre-mixed to prepare a second composition to form the layer comprising the material capable of occluding lithium (active layer).

The first resin composition and second resin composition were respectively supplied by a feeder to respective feed ports of two twin-screw extruders, under a nitrogen atmosphere. Liquid paraffin (kinematic viscosity at 37.78° C.: $7.59 \times 10^{-5}$ m$^2$/s) was also injected into the twin-screw extruder cylinders by a plunger pump. The liquid paraffin was side-fed to the twin-screw extruder cylinders to a plasticizer ratio of 55 weight % in total extruded mixture from melt kneading of the first resin composition, and to a plasticizer ratio of 60 weight % in the total extruded mixture from melt kneading of the second resin composition.

The first and second resin compositions were then melt kneaded at 200° C., and each was passed through a gear pump set to a temperature of 200° C., a conduit and a T-die capable of co-extrusion of three layers of two different types, and cooled with a roll having a surface temperature of 80° C., to obtain a sheet-like composition comprising the insulating layer (I) and insulating layer (II) composed of the first composition, as the surface layers, and the active layer composed of the second composition as the interlayer.

The temperature and stretch factor of the sheet-like composition were then continuously adjusted with a simultaneous biaxial stretcher while stretching, after which the stretched sheet was immersed in methylene chloride for extraction removal of the liquid paraffin and then dried. The obtained sheet was subsequently subjected to transverse stretching and relaxation heat treatment to obtain a separator.

Example 23

Instead of layering the final insulating layer (I) and hot pressing as in Example 21, a coating solution was prepared by evenly dispersing 96.0 parts by weight of tabular aluminum hydroxide oxide (mean particle diameter: 1.0 μm) and 4.0 parts by weight of an acrylic polymer latex (solid concentration: 40%, mean particle diameter: 145 nm, Tg: −10° C.), with 1.0 part by weight of an aqueous ammonium polycarboxylate solution (SN Dispersant 5468 by San Nopco, Ltd.) in 100 parts by weight of water, and was applied to the layer comprising the material capable of occluding lithium (active layer) using a gravure coater. The coating layer on the active layer was dried at 60° C. to remove the water, to obtain a multilayered porous membrane having an insulating layer (II) with a thickness of 5 μm formed on the active layer. A battery was fabricated with the insulating layer (II) facing the negative electrode surface.

Example 24

A separator was obtained in the same manner as Example 22, except for adjustment so that the weight ratio of the flaky graphite and high-density polyethylene resin was 50:50 as the weight ratio.

Examples 25 and 26

Separators were obtained in the same manner as Example 22, except for adjusting the extrusion output and the thickness of the cooled sheet to modify the thickness of the insulating layer.

Examples 27 to 29 and 33

Separators were obtained in the same manner as Example 22, except that the extrusion output, the stretching temperature and the magnification were adjusted to modify the number of pores and the pore size.

Examples 30 to 32

Separators were obtained in the same manner as Example 22, except for using a material (A) obtained by sputtering gold (Au), as shown in Table 8.

Example 34

A separator was obtained in the same manner as Example 23, except that the inorganic filler of the insulating layer (II) was changed to tabular aluminum silicate (mean particle diameter: 1.0 μm).

Example 35

A separator was obtained in the same manner as Example 23, except that the inorganic filler of the insulating layer (II) was changed to tabular barium sulfate (mean particle diameter: 1.0 μm).

Example 36

A separator was obtained in the same manner as Example 34, except that the shape of the inorganic filler of the insulating layer (II) was changed to block-shaped (mean particle diameter: 1.0 μm).

Example 37

A separator was obtained in the same manner as Example 34, except that the shape of the inorganic filler of the insulating layer (II) was changed to a scaly form (mean particle diameter: 3.0 μm).

Example 38

A separator was obtained in the same manner as Example 23, except that the weight ratio of the graphite and the acrylic polymer latex was changed to 98:2.

Comparative Example 11

A two-layered separator was obtained, omitting the step of layering the final insulating layer (I) and thermal lamination in Example 21. The battery was fabricated with the active layer facing the negative electrode surface.

Comparative Example 12

A battery was fabricated using the separator of Comparative Example 11, with the active layer facing the positive electrode surface.

Comparative Example 13

The insulating layer (I) fabricated in Example 21 was used as a separator.

Comparative Example 14

A mixture of NMP, PVDF and graphite in a weight ratio of 50:5:1 was stirred for 10 hours to dissolve the PVDF in the NMP. The paste prepared in this manner was applied to a glass plate to a uniform thickness and then immersed in water to remove the NMP, thereby solidifying the PVDF to fabricate a PVDF membrane comprising graphite. Because the escape routes of NMP in the water form holes during solidification of the polymer, the formed membrane was a porous membrane having communicating pores. The membrane was vacuum dried at 65° C. for 10 hours to remove the water and obtain a porous membrane with a thickness of 20 μm. The porous membrane was pressed to obtain an active layer with a thickness of 10 μm, and was attached to one side of the insulating layer (I) obtained in Example 22 through a heat laminator (set to 60° C., 0.2 MPa), for use as a separator. A battery was fabricated with the active layer facing the negative electrode surface.

Comparative Example 15

The insulating layer (I) obtained in Example 21 was attached to the other side of the separator fabricated in Comparative Example 14 through a heat laminator (set to 60° C., 0.2 MPa) to obtain a separator having insulating layers (I) laminated on both sides of the active layer.

Comparative Example 16

Spherical titania, an acrylic polymer latex (solid concentration: 40%, mean particle diameter: 145 nm, Tg: −10° C.) and carboxymethyl cellulose (CMC) were mixed with water in a material weight ratio of 98:1:1 in terms of solid ratio, to prepare a coating material for a layer comprising a material capable of occluding lithium (active layer). The coating material was applied onto one side of the insulating layer (I) obtained in Example 21 using a bar coater and dried at 60° C. to remove the water, thereby forming a 5 μm-thick layer comprising a material capable of occluding lithium (active layer).

Next, alumina, an acrylic polymer latex (solid concentration: 40%) and carboxymethyl cellulose (CMC) were mixed with water in a material weight ratio of 98:1:1 in terms of solid ratio, to prepare a coating material for the insulating layer (II). The coating material for the insulating layer (II) was applied onto the surface of the active layer obtained above using a bar coater and dried at 60° C. to remove the water, forming an insulating layer (II) with a thickness of 5 μm, thus obtaining a separator comprising an active layer as the interlayer.

Comparative Example 17

A separator was obtained in the same manner as Comparative Example 14, except for changing the amounts of graphite and PVDF to 30 parts by weight of graphite and 70 parts by weight of PVDF.

TABLE 7

|  |  | Example 21 | Example 22 | Example 23 | Example 24 | Example 25 | Example 26 |
|---|---|---|---|---|---|---|---|
| Number of layers | | 3-Layered | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Graphite | Graphite | Graphite |
| | Form of material capable of occluding lithium | Flaky | Flaky | Flaky | Flaky | Flaky | Flaky |
| | (2) Resin A | Acrylic | PE | Acrylic | PE | Acrylic | Acrylic |
| | Weight ratio (1):(2) | 90:10 | 81:19 | 90:10 | 50:50 | 90:10 | 90:10 |
| B. Construction of insulating layer (I) not comprising material capable of occluding lithium | (3) Inorganic filler | — | — | — | — | — | — |
| | (4) Resin B | PE, PP | PE, PP | PE, PP | PE, PP | PE, PP | PE, PP |
| | Weight ratio (3):(4) | — | — | — | — | — | — |

TABLE 7-continued

|  |  | Example 21 | Example 22 | Example 23 | Example 24 | Example 25 | Example 26 |
|---|---|---|---|---|---|---|---|
| C. Construction of insulating layer (II) not comprising material capable of occluding lithium | (5) Inorganic filler | — | — | Aluminum hydroxide oxide | — | — | — |
|  | Inorganic filler form | — | — | Tabular | — | — | — |
|  | (6) Resin C | PE, PP | PE, PP | Acrylic | PE, PP | PE, PP | PE, PP |
|  | Weight ratio (5):(6) | — | — | 96:4 | — | — | — |
| Separator physical properties | Electrical resistivity of active layer (Ωcm) | 0.1 | 0.6 | 0.1 | 10 | 0.1 | 0.1 |
|  | Air permeability (s) of separator (layered state) | 150 | 120 | 100 | 200 | 100 | 220 |
|  | Withstand voltage (kV) of separator (layered state) | 1.8 | 1.5 | 1.7 | 2.5 | 0.5 | 2.4 |
|  | Average number of pores (/μm$^2$) of insulating layer (I) | 135 | 130 | 135 | 130 | 100 | 120 |
|  | Mean pore size (μm) of insulating layer (I) | 0.05 | 0.08 | 0.05 | 0.08 | 0.07 | 0.09 |
| Thicknesses (μm) | A. layer | 5 | 5 | 5 | 5 | 5 | 5 |
|  | B. layer | 10 | 10 | 10 | 10 | 3 | 15 |
|  | C. layer | 10 | 10 | 5 | 10 | 3 | 15 |
|  | A. layer thickness % | 20 | 20 | 25 | 20 | 45 | 14 |
| Basic battery properties | Initial discharge capacity | S | S | S | S | S | S |
|  | Rate characteristic | A | A | S | B | S | B |
|  | Cycle characteristic | S | S | S | A | S | A |
| Battery safety | Dendrite short circuiting test (A) | S | A | S | S | A | S |
|  | Nail penetration test (A) | A | S | A | A | A | S |

TABLE 8

|  |  | Example 27 | Example 28 | Example 29 | Example 30 | Example 31 | Example 32 |
|---|---|---|---|---|---|---|---|
| Number of layers |  | 3-Layered | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Au-sputtered silicon | Au-sputtered lithium titanate | Au-sputtered manganese oxide |
|  | Form of material capable of occluding lithium | Flaky | Flaky | Flaky | Spherical | Spherical | Spherical |
|  | (2) Resin A | Acrylic | Acrylic | Acrylic | Acrylic | Acrylic | Acrylic |
|  | Weight ratio (1):(2) | 90:10 | 90:10 | 90:10 | 90:10 | 90:10 | 90:10 |
| B. Construction of insulating layer (I) not comprising material capable of occluding lithium | (3) Inorganic filler | — | — | — | — | — | — |
|  | (4) Resin B | PE, PP | PE, PP | PE, PP | PE, PP | PE, PP | PE, PP |
|  | Weight ratio (3):(4) | — | — | — | — | — | — |
| C. Construction of insulating layer (II) not comprising material capable of occluding lithium | (5) Inorganic filler | — | — | — | — | — | — |
|  | Inorganic filler form | — | — | — | — | — | — |
|  | (6) Resin C | PE, PP | PE, PP | PE, PP | PE, PP | PE, PP | PE, PP |
|  | Weight ratio (5):(6) | — | — | — | — | — | — |
| Separator physical properties | Electrical resistivity of active layer (Ωcm) | 0.1 | 0.1 | 0.1 | 0.1 | 0.1 | 0.1 |
|  | Air permeability (s) of separator (layered state) | 140 | 210 | 130 | 130 | 130 | 130 |
|  | Withstand voltage (kV) of separator (layered state) | 1.8 | 1.8 | 1.8 | 1.9 | 2.0 | 2.0 |
|  | Average number of pores (/μm$^2$) of insulating layer (I) | 60 | 50 | 80 | 80 | 80 | 80 |
|  | Mean pore size (μm) of insulating layer (I) | 0.12 | 0.06 | 0.1 | 0.1 | 0.1 | 0.1 |
| Thicknesses (μm) | A. layer | 5 | 5 | 5 | 5 | 5 | 5 |
|  | B. layer | 10 | 10 | 10 | 10 | 10 | 10 |
|  | C. layer | 10 | 10 | 10 | 10 | 10 | 10 |
|  | A. layer thickness % | 20 | 20 | 20 | 20 | 20 | 20 |
| Basic battery properties | Initial discharge capacity | S | S | S | S | S | S |
|  | Rate characteristic | S | B | S | S | S | S |
|  | Cycle characteristic | S | A | S | S | S | S |
| Battery safety | Dendrite short circuiting test (A) | S | S | S | S | S | S |
|  | Nail penetration test (A) | S | S | S | S | S | S |

TABLE 9

|  |  | Example 33 | Example 34 | Example 35 | Example 36 | Example 37 | Example 38 |
| --- | --- | --- | --- | --- | --- | --- | --- |
| Number of layers |  | 3-Layered | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Graphite | Graphite | Graphite |
|  | Form of material capable of occluding lithium | Flaky | Flaky | Flaky | Flaky | Flaky | Flaky |
|  | (2) Resin A | Acrylic | Acrylic | Acrylic | Acrylic | Acrylic | Acrylic |
|  | Weight ratio (1):(2) | 90:10 | 90:10 | 90:10 | 90:10 | 90:10 | 98:2 |
| B. Construction of insulating layer (I) not comprising material capable of occluding lithium | (3) Inorganic filler | — | — | — | — | — | — |
|  | (4) Resin B | PE, PP | PE, PP | PE, PP | PE, PP | PE, PP | PE, PP |
|  | Weight ratio (3):(4) | — | — | — | — | — | — |
| C. Construction of insulating layer (II) not comprising material capable of occluding lithium | (5) Inorganic filler | — | Aluminum silicate | Barium sulfate | Aluminum silicate | Aluminum silicate | Aluminum hydroxide oxide |
|  | Inorganic filler form | — | Tabular | Tabular | Block | Scaly | Tabular |
|  | (6) Resin C | PE, PP | Acrylic | Acrylic | Acrylic | Acrylic | Acrylic |
|  | Weight ratio (5):(6) | — | 96:4 | 96:4 | 96:4 | 96:4 | 96:4 |
| Separator physical properties | Electrical resistivity of active layer (Ωcm) | 0.1 | 0.1 | 0.1 | 0.1 | 0.1 | 0.001 |
|  | Air permeability (s) of separator (layered state) | 160 | 120 | 120 | 120 | 130 | 130 |
|  | Withstand voltage (kV) of separator (layered state) | 1.8 | 1.7 | 1.7 | 1.7 | 1.7 | 1.7 |
|  | Average number of pores (/μm$^2$) of insulating layer (I) | 30 | 135 | 135 | 135 | 135 | 135 |
|  | Mean pore size (μm) of insulating layer (I) | 0.14 | 0.05 | 0.05 | 0.05 | 0.05 | 0.05 |
| Thicknesses (μm) | A. layer | 5 | 5 | 5 | 5 | 5 | 5 |
|  | B. layer | 10 | 10 | 10 | 10 | 10 | 10 |
|  | C. layer | 10 | 5 | 5 | 5 | 5 | 5 |
|  | A. layer thickness % | 20 | 25 | 25 | 25 | 25 | 25 |
| Basic battery properties | Initial discharge capacity | S | S | S | S | S | S |
|  | Rate characteristic | S | S | S | S | S | S |
|  | Cycle characteristic | S | S | S | S | S | S |
| Battery safety | Dendrite short circuiting test (A) | S | S | S | S | S | S |
|  | Nail penetration test (A) | S | S | S | S | S | S |

TABLE 10

|  |  | Comp. Example 11 | Comp. Example 12 | Comp. Example 13 | Comp. Example 14 |
| --- | --- | --- | --- | --- | --- |
| Number of layers |  | 2-layered | 2-layered | Single layer | 2-layered |
| A. Construction of layer comprising material capable of occluding lithium (active layer) | (1) Material (A) capable of occluding lithium | Graphite | Graphite | — | Graphite |
|  | Form of material capable of occluding lithium | Flaky | Flaky | — | Flaky |
|  | (2) Resin A | Acrylic | Acrylic | — | PVDF |
|  | Weight ratio (1):(2) | 90:10 | 90:10 | — | 1:5 |
| B. Construction of insulating layer (I) not comprising material capable of occluding lithium | (3) Inorganic filler | — | — | — | — |
|  | (4) Resin B | PE, PP | PE, PP | PE, PP | PE, PP |
|  | Weight ratio (3):(4) | — | — | — | — |
| C. Construction of insulating layer (II) not comprising material capable of occluding lithium | (5) Inorganic filler | — | — | — | — |
|  | Inorganic filler form | — | — | — | — |
|  | (6) Resin C | — | — | — | — |
|  | Weight ratio (5):(6) | — | — | — | — |
| Separator physical properties | Electrical resistivity of active layer (Ωcm) | 0.1 | 0.1 | — | 100,000 |
|  | Air permeability (s) of separator (layered state) | 100 | 100 | 70 | 220 |
|  | Withstand voltage (kV) of separator (layered state) | 0.7 | 0.7 | 1.2 | 1.6 |
|  | Average number of pores (/μm$^2$) of insulating layer (I) | 135 | 135 | 135 | 135 |
|  | Mean pore size (μm) of insulating layer (I) | 0.05 | 0.05 | 0.05 | 0.05 |
| Thicknesses (μm) | A. layer | 5 | 5 | — | 10 |
|  | B. layer | 10 | 10 | 10 | 10 |
|  | C. layer | — | — | — | — |
|  | A. layer thickness % | 33 | 33 | 0 | 50 |

TABLE 10-continued

| Basic battery properties | Initial discharge capacity | A | A | S | B |
|---|---|---|---|---|---|
| | Rate characteristic | B | A | A | B |
| | Cycle characteristic | B | A | B | B |
| Battery safety | Dendrite short circuiting test (A) | C | C | D | C |
| | Nail penetration test (A) | B | B | B | A |

| | | Comp. Example 15 | Comp. Example 16 | Comp. Example 17 |
|---|---|---|---|---|
| Number of layers | | 2-Layered | 3-Layered | 3-Layered |
| A. Construction of layer comprising material capable of occluding lithium (active layer) | (1) Material (A) capable of occluding lithium | Graphite | Titania | Graphite |
| | Form of material capable of occluding lithium | Flaky | Spherical | Flaky |
| | (2) Resin A | PVDF | Acrylic | PVDF |
| | Weight ratio (1):(2) | 1:5 | 98:1 (:CMC 1) | 30:70 |
| B. Construction of insulating layer (I) not comprising material capable of occluding lithium | (3) Inorganic filler | — | — | — |
| | (4) Resin B | PE, PP | PE, PP | PE, PP |
| | Weight ratio (3):(4) | — | — | — |
| C. Construction of insulating layer (II) not comprising material capable of occluding lithium | (5) Inorganic filler | — | Alumina | — |
| | Inorganic filler form | — | Spherical | — |
| | (6) Resin C | PE, PP | Acrylic | PE, PP |
| | Weight ratio (5):(6) | — | 98:1 (:CMC 1) | — |
| Separator physical properties | Electrical resistivity of active layer (Ωcm) | 100,000 | 100,000,000 | 500 |
| | Air permeability (s) of separator (layered state) | 280 | 120 | 260 |
| | Withstand voltage (kV) of separator (layered state) | 2.6 | 1.7 | 2 |
| | Average number of pores (/μm$^2$) of insulating layer (I) | 135 | 135 | 135 |
| | Mean pore size (μm) of insulating layer (I) | 0.05 | 0.05 | 0.05 |
| Thicknesses (μm) | A. layer | 10 | 5 | 10 |
| | B. layer | 10 | 10 | 10 |
| | C. layer | 10 | 5 | 10 |
| | A. layer thickness % | 33 | 25 | 33 |
| Basic battery properties | Initial discharge capacity | S | S | S |
| | Rate characteristic | B | B | B |
| | Cycle characteristic | A | A | A |
| Battery safety | Dendrite short circuiting test (A) | B | B | A |
| | Nail penetration test (A) | A | A | A |

<Test Series III>

Example 39

High-density polyethylene homopolymer with a My of 700,000, at 45 parts by weight,
high-density polyethylene homopolymer with a My of 300,000, at 45 parts by weight, and
polypropylene homopolymer with a My of 400,000, at 5 parts by weight, were dry blended using a tumbler blender.

To 99 parts by weight of the obtained polyolefin mixture there was added 1 part by weight of tetrakis-[methylene-(3', 5'-di-t-butyl-4'-hydroxyphenyl)propionate]methane as an antioxidant, and a tumbler blender was again used for dry blending to obtain a mixture.

The obtained mixture was supplied to a twin-screw extruder through a feeder, under a nitrogen atmosphere.

Liquid paraffin (kinematic viscosity at 37.78° C.: 7.59×10$^{-5}$ m$^2$/s) was also injected into the extruder cylinder by a plunger pump.

The operating conditions for the feeder and pump were adjusted for a liquid paraffin content of 65 parts by weight and a polymer concentration of 35 parts by weight in the total of 100 parts by weight of the mixture to be extruded.

The contents were then melt kneaded in the twin-screw extruder while heating to 180° C., the obtained melt kneaded mixture was extruded through a T-die onto a cooling roll controlled to a surface temperature of 80° C., and the extruded mixture was contacted with a cooling roll for casting and cooled to solidification to obtain a cast sheet with a thickness of 1350 μm.

The sheet was then stretched to MD 7 times×TD 6.4 times at 122° C. using a simultaneous biaxial stretcher, and the stretched sheet was immersed in methylene chloride for extraction removal of the liquid paraffin and then dried. The sheet was transversely stretched to 1.9 times at 128° C. using a transverse stretcher, and then subjected to relaxation heat treatment at 133° C. to 1.65 times finally, to obtain a polyolefin microporous membrane. The obtained polyolefin microporous membrane was used as insulating layer (I). The cooled sheet thickness, the simultaneous biaxial stretching temperature, the transverse stretching factor and temperature and the relaxation heat treatment factor and temperature were adjusted to modify the thickness, pore size and number of pores of the resulting insulating layer (I).

Next, 50 parts by weight of flaky graphite, 40 parts by weight of tabular aluminum hydroxide oxide (mean particle diameter: 1.0 μm) and 10 parts by weight of an acrylic polymer latex (solid concentration: 40%, mean particle diameter: 145 nm, Tg=–10° C.), with 1.0 part by weight of an aqueous ammonium polycarboxylate solution (SN Dispersant 5468 by San Nopco, Ltd.) and 2.0 parts by weight of carboxymethyl cellulose (CMC) were evenly dispersed in 100 parts by weight of water to prepare a coating solution, and the coating solution was applied onto the insulating layer (I) by a gravure coater. The coating layer on the insulating layer (I) was dried at 60° C. to remove the water, forming a layer comprising a material capable of occluding lithium (active layer) to a thickness of 5 μm on the insulating layer (I) (insulating layer (I)+active layer).

Finally, using a heat laminator, the laminated body (insulating layer (I)+active layer) and the insulating layer (I) were layered and passed through a rubber roll set to 60° C., 0.2 MPa, to obtain a separator with a 3-layer structure.

Example 40

There were mixed 95 parts by weight of high-density polyethylene with a Mv of 300,000 and 5 parts by weight of polypropylene with a Mv of 400,000, as the starting materials for insulating layers (I) and (II), and 1 part by weight of tetrakis[methylene-3-(3',5'-di-t-butyl-4'-hydroxyphenyl) propionate]methane as an antioxidant, to prepare a first composition to form insulating layer (I) and insulating layer (II).

Using a Henschel mixer, 40 parts by weight of flaky graphite, 40 parts by weight of tabular aluminum hydroxide oxide (mean particle diameter: 1.0 μm) and 20 parts by weight of high-density polyethylene resin with a Mv of 700,000, as the starting material for the layer comprising the material capable of occluding lithium, 44.8 parts by weight of liquid paraffin as a plasticizer and 1 part by weight of tetrakis[methylene-3-(3',5'-di-t-butyl-4'-hydroxyphenyl) propionate]methane as an antioxidant, were pre-mixed to prepare a second composition to form the layer comprising the material capable of occluding lithium (active layer).

The first resin composition and second resin composition were respectively supplied by a feeder to respective feed ports of two twin-screw extruders, under a nitrogen atmosphere. Liquid paraffin (kinematic viscosity at 37.78° C.: $7.59 \times 10^{-5}$ m$^2$/s) was also injected into the twin-screw extruder cylinders by a plunger pump. The liquid paraffin was side-fed to the twin-screw extruder cylinders to a plasticizer ratio of 55 weight % in the total extruded mixture from melt kneading of the first resin composition, and to a plasticizer ratio of 60 weight % in the total extruded mixture from melt kneading of the second resin composition.

The first and second resin compositions were then melt kneaded at 200° C., and each was passed through a gear pump set to a temperature of 200° C., a conduit and a T-die capable of co-extrusion of three layers of two different types, and cooled with a roll having a surface temperature of 80° C., to obtain a sheet-like composition comprising the insulating layer (I) and insulating layer (II) composed of the first composition as the surface layers and the active layer composed of the second composition as the interlayer.

The temperature and stretch factor of the sheet-like composition were then continuously adjusted with a simultaneous biaxial stretcher while stretching, after which the stretched sheet was immersed in methylene chloride for extraction removal of the liquid paraffin and then dried. The obtained sheet was subsequently subjected to transverse stretching and relaxation heat treatment to obtain a separator.

Example 41

Instead of layering the final insulating layer (I) and hot pressing as in Example 39, a coating solution was prepared by evenly dispersing 96.0 parts by weight of tabular aluminum hydroxide oxide (mean particle diameter: 1.0 μm) and 4.0 parts by weight of an acrylic polymer latex (solid concentration: 40%, mean particle diameter: 145 nm, Tg=−10° C.), with 1.0 part by weight of an aqueous ammonium polycarboxylate solution (SN Dispersant 5468 by San Nopco, Ltd.) in 100 parts by weight of water, and was applied to the layer comprising the material capable of occluding lithium (active layer) using a gravure coater. The coating layer on the active layer was dried at 60° C. to remove the water, to obtain a multilayered porous membrane having an insulating layer (II) with a thickness of 5 μm formed on the active layer. A battery was fabricated with the insulating layer (II) facing the negative electrode surface.

Examples 42 and 43

Separators were obtained in the same manner as Example 40, except that the materials of the active layers were adjusted to the weight ratios listed in Table 11 to modify the electrical resistivity of the active layers, and the extrusion output, stretching temperature and magnification were adjusted to modify the number of pores and the pore size.

Examples 44 and 45

Separators were obtained in the same manner as Example 39, except for adjusting the extrusion output and the thickness of the cooled sheet to modify the thickness of the insulating layer.

Examples 46 to 48 and 54

Separators were obtained in the same manner as Example 39, except that the extrusion output, the stretching temperature and the magnification were adjusted to modify the number of pores and the pore size.

Examples 49 and 50

Separators were obtained in the same manner as Example 39, except that conductive particles in the active layers were changed as shown in Table 13.

Examples 51 to 53

Separators were obtained in the same manner as Example 39, except for using a material (A) obtained by sputtering gold (Au), as shown in Table 13.

Example 55

A separator was obtained in the same manner as Example 41, except that the inorganic filler of the insulating layer (II) was changed to tabular aluminum silicate (mean particle diameter: 1.0 μm).

Example 56

A separator was obtained in the same manner as Example 41, except that the inorganic filler of the insulating layer (II) was changed to tabular barium sulfate (mean particle diameter: 1.0 μm).

Example 57

A separator was obtained in the same manner as Example 55, except that the shape of the inorganic filler of the insulating layer (II) was changed to block-shaped (mean particle diameter: 1.0 μm).

Example 58

A separator was obtained in the same manner as Example 55, except that the shape of the inorganic filler of the insulating layer (II) was changed to a scaly form (mean particle diameter: 3.0 μm).

Comparative Example 18

A two-layered separator was obtained in the same manner as Example 39, except that the material of the active layer was adjusted to the weight ratio listed in Table 15, and the step of layering of the insulating layer (I) and thermal lamination was omitted.
The battery was fabricated with the active layer facing the negative electrode surface.

Comparative Example 19

A battery was fabricated using the separator of Comparative Example 18, with the active layer facing the positive electrode surface.

Comparative Example 20

The insulating layer (I) fabricated in Example 39 was used as a separator.

Comparative Example 21

A mixture of NMP, PVDF and graphite in a weight ratio of 50:5:1 was stirred for 10 hours to dissolve the PVDF in the NMP. The paste prepared in this manner was applied to a glass plate to a uniform thickness and then immersed in water to remove the NMP, thereby solidifying the PVDF to fabricate a PVDF membrane comprising graphite. Because the escape routes of NMP in the water form holes during solidification of the polymer, the formed membrane was a porous membrane having communicating pores. The membrane was vacuum dried at 65° C. for 10 hours to remove the water and obtain a porous membrane with a thickness of 20 μm. The porous membrane was pressed to obtain an active layer with a thickness of 10 μm, and was attached to one side of the insulating layer (I) obtained in Example 39 through a heat laminator (set to 60° C., 0.2 MPa), for use as a separator. A battery was fabricated with the active layer facing the negative electrode surface.

Comparative Example 22

The insulating layer (I) obtained in Example 39 was attached to the other side of the separator fabricated in Comparative Example 21 through a heat laminator (set to 60° C., 0.2 MPa) to obtain a separator having insulating layers (I) laminated on both sides of the active layer.

Comparative Example 23

Spherical titania, an acrylic polymer latex (solid concentration: 40%, mean particle diameter: 145 nm, Tg=−10° C.) and carboxymethyl cellulose (CMC) were mixed with water in a material weight ratio of 98:1:1 in terms of solid ratio, to prepare a coating material for a layer comprising a material capable of occluding lithium (active layer). The coating material was applied onto one side of the insulating layer (I) obtained in Example 39 using a bar coater and dried at 60° C. to remove the water, thereby forming a 5 μm-thick layer comprising a material capable of occluding lithium (active layer).
Next, alumina, an acrylic polymer latex (solid concentration: 40%, mean particle diameter: 145 nm, Tg=−10° C.) and carboxymethyl cellulose (CMC) were mixed with water in a material weight ratio of 98:1:1 in terms of solid ratio, to prepare a coating material for the insulating layer (II). The coating material for the insulating layer (II) was applied onto the surface of the active layer obtained above using a bar coater and dried at 60° C. to remove the water, forming an insulating layer (II) with a thickness of 5 μm, thus obtaining a separator comprising an active layer as the interlayer.

Comparative Example 24

A separator was obtained in the same manner as Example 39, except that the constituent material ratio for the active layer material was adjusted to the value listed in Table 15.

TABLE 11

| | | Example 39 | Example 40 | Example 41 | Example 42 | Example 43 |
|---|---|---|---|---|---|---|
| Number of layers | | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Graphite | Graphite |
| | Form of material capable of occluding lithium | Flaky | Flaky | Flaky | Flaky | Flaky |
| | (2) Insulating particles | Aluminum hydroxide oxide | Aluminum hydroxide oxide | Aluminum hydroxide oxide | — | — |
| | Form of insulating particles | Tabular | Tabular | Tabular | — | — |
| | (3) Resin A | Acrylic | PE | Acrylic | PE | PE |
| | Weight ratio (1):(2):(3) | 50:40:10 | 40:40:20 | 50:40:10 | 20:0:80 | 30:0:70 |
| B. Construction of insulating layer (I) not comprising material capable of occluding lithium | (3) Inorganic filler | — | — | — | — | — |
| | (4) Resin B | PE, PP | PE, PP | PE, PP | PE, PP | PE, PP |
| | Weight ratio (3):(4) | — | — | — | — | — |

TABLE 11-continued

|  |  | Example 39 | Example 40 | Example 41 | Example 42 | Example 43 |
|---|---|---|---|---|---|---|
| C. Construction of insulating layer (II) not comprising material capable of occluding lithium | (5) Inorganic filler | — | — | Aluminum hydroxide oxide | — | — |
|  | Inorganic filler form | — | — | Tabular | — | — |
|  | (6) Resin C | PE, PP | PE, PP | Acrylic | PE, PP | PE, PP |
|  | Weight ratio (5):(6) | — | — | 96:4 | — | — |
| Separator physical properties | Electrical resistivity of active layer (Ωcm) | 100 | 500 | 100 | 8000 | 2000 |
|  | Air permeability (s) of separator (layered state) | 350 | 380 | 220 | 340 | 320 |
|  | Withstand voltage (kV) of separator (layered state) | 1.9 | 2.2 | 1.9 | 2.3 | 2.4 |
|  | Average number of pores (/μm$^2$) of insulating layer (I) | 60 | 70 | 60 | 80 | 80 |
|  | Mean pore size (μm) of insulating layer (I) | 0.1 | 0.065 | 0.1 | 0.065 | 0.065 |
| Thicknesses (μm) | A. layer | 5 | 5 | 5 | 5 | 5 |
|  | B. layer | 10 | 10 | 10 | 10 | 10 |
|  | C. layer | 10 | 10 | 5 | 10 | 10 |
|  | A. layer thickness % | 20 | 20 | 25 | 20 | 20 |
| Basic battery properties | Initial discharge capacity | S | S | S | S | S |
|  | Cycle characteristic | S | S | S | A | S |
| Battery safety | Dendrite short circuiting test (A) | S | A | S | A | A |
|  | Nail penetration test (A) | S | S | S | S | S |
|  | Nail penetration test (B) | A | A | A | A | A |

TABLE 12

|  |  | Example 44 | Example 45 | Example 46 | Example 47 | Example 48 |
|---|---|---|---|---|---|---|
| Number of layers |  | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Graphite | Graphite |
|  | Form of material capable of occluding lithium | Flaky | Flaky | Flaky | Flaky | Flaky |
|  | (2) Insulating particles | Aluminum hydroxide oxide | Aluminum hydroxide oxide | Aluminum hydroxide oxide | Aluminum hydroxide oxide | Aluminum hydroxide oxide |
|  | Form of insulating particles | Tabular | Tabular | Tabular | Tabular | Tabular |
|  | (3) Resin A | Acrylic | Acrylic | Acrylic | Acrylic | Acrylic |
|  | Weight ratio (1):(2):(3) | 50:40:10 | 50:40:10 | 50:40:10 | 50:40:10 | 50:40:10 |
| B. Construction of insulating layer (I) not comprising material capable of occluding lithium | (3) Inorganic filler | — | — | — | — | — |
|  | (4) Resin B | PE, PP | PE, PP | PE, PP | PE, PP | PE, PP |
|  | Weight ratio (3):(4) | — | — | — | — | — |
| C. Construction of insulating layer (II) not comprising material capable of occluding lithium | (5) Inorganic filler | — | — | — | — | — |
|  | Inorganic filler form | — | — | — | — | — |
|  | (6) Resin C | PE, PP | PE, PP | PE, PP | PE, PP | PE, PP |
|  | Weight ratio (5):(6) | — | — | — | — | — |
| Separator physical properties | Electrical resistivity of active layer (Ωcm) | 100 | 100 | 100 | 100 | 100 |
|  | Air permeability (s) of separator (layered state) | 200 | 460 | 200 | 180 | 380 |
|  | Withstand voltage (kV) of separator (layered state) | 0.8 | 3.4 | 1.9 | 1.9 | 1.9 |
|  | Average number of pores (/μm$^2$) of insulating layer (I) | 60 | 60 | 135 | 100 | 90 |
|  | Mean pore size (μm) of insulating layer (I) | 0.1 | 0.1 | 0.065 | 0.1 | 0.065 |
| Thicknesses (μm) | A. layer | 5 | 5 | 5 | 5 | 5 |
|  | B. layer | 3 | 15 | 10 | 10 | 10 |
|  | C. layer | 3 | 15 | 10 | 10 | 10 |
|  | A. layer thickness % | 45 | 14 | 20 | 20 | 20 |
| Basic battery properties | Initial discharge capacity | S | S | S | S | S |
|  | Cycle characteristic | A | A | S | A | S |
| Battery safety | Dendrite short circuiting test (A) | A | S | S | S | S |
|  | Nail penetration test (A) | S | S | S | S | S |
|  | Nail penetration test (B) | A | S | S | S | S |

TABLE 13

|  |  | Example 49 | Example 50 | Example 51 | Example 52 | Example 53 |
|---|---|---|---|---|---|---|
| Number of layers | | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Au-sputtered silicon | Au-sputtered lithium titanate | Au-sputtered manganese oxide |
| | Form of material capable of occluding lithium | Flaky | Flaky | Spherical | Spherical | Spherical |
| | (2) Insulating particles | Barium sulfate | Aluminum silicate | Aluminum hydroxide oxide | Aluminum hydroxide oxide | Aluminum hydroxide oxide |
| | Form of insulating particles | Tabular | Tabular | Tabular | Tabular | Tabular |
| | (3) Resin A | Acrylic | Acrylic | Acrylic | Acrylic | Acrylic |
| | Weight ratio (1):(2):(3) | 50:40:10 | 50:40:10 | 50:40:10 | 50:40:10 | 50:40:10 |
| B. Construction of insulating layer (I) not comprising material capable of occluding lithium | (3) Inorganic filler | — | — | — | — | — |
| | (4) Resin B | PE, PP | PE, PP | PE, PP | PE, PP | PE, PP |
| | Weight ratio (3):(4) | — | — | — | — | — |
| C. Construction of insulating layer (II) not comprising material capable of occluding lithium | (5) Inorganic filler | — | — | — | — | — |
| | Inorganic filler form | — | — | — | — | — |
| | (6) Resin C | PE, PP | PE, PP | PE, PP | PE, PP | PE, PP |
| | Weight ratio (5):(6) | — | — | — | — | — |
| Separator physical properties | Electrical resistivity of active layer ($\Omega$cm) | 100 | 100 | 100 | 100 | 100 |
| | Air permeability (s) of separator (layered state) | 380 | 380 | 380 | 380 | 380 |
| | Withstand voltage (kV) of separator (layered state) | 1.9 | 1.9 | 2 | 2.2 | 2.2 |
| | Average number of pores (/$\mu m^2$) of insulating layer (I) | 90 | 90 | 90 | 90 | 90 |
| | Mean pore size ($\mu$m) of insulating layer (I) | 0.065 | 0.065 | 0.065 | 0.065 | 0.065 |
| Thicknesses ($\mu$m) | A. layer | 5 | 5 | 5 | 5 | 5 |
| | B. layer | 10 | 10 | 10 | 10 | 10 |
| | C. layer | 10 | 10 | 10 | 10 | 10 |
| | A. layer thickness % | 20 | 20 | 20 | 20 | 20 |
| Basic battery properties | Initial discharge capacity | S | S | S | S | S |
| | Cycle characteristic | S | S | S | S | S |
| Battery safety | Dendrite short circuiting test (A) | S | S | S | S | S |
| | Nail penetration test (A) | S | S | S | S | S |
| | Nail penetration test (B) | S | S | S | S | S |

TABLE 14

|  |  | Example 54 | Example 55 | Example 56 | Example 57 | Example 58 |
|---|---|---|---|---|---|---|
| Number of layers | | 3-Layered | 3-Layered | 3-Layered | 3-Layered | 3-Layered |
| A. Construction of layer comprising material capable of occluding lithium (active layer) | (1) Material (A) capable of occluding lithium | Graphite | Graphite | Graphite | Graphite | Graphite |
| | Form of material capable of occluding lithium | Flaky | Flaky | Flaky | Flaky | Flaky |
| | (2) Insulating particles | Aluminum hydroxide oxide | Aluminum hydroxide oxide | Aluminum hydroxide oxide | Aluminum hydroxide oxide | Aluminum hydroxide oxide |
| | Form of insulating particles | Tabular | Tabular | Tabular | Tabular | Tabular |
| | (3) Resin A | Acrylic | Acrylic | Acrylic | Acrylic | Acrylic |
| | Weight ratio (1):(2):(3) | 50:40:10 | 50:40:10 | 50:40:10 | 50:40:10 | 50:40:10 |
| B. Construction of insulating layer (I) not comprising material capable of occluding lithium | (3) Inorganic filler | — | — | — | — | — |
| | (4) Resin B | PE, PP | PE, PP | PE, PP | PE, PP | PE, PP |
| | Weight ratio (3):(4) | — | — | — | — | — |
| C. Construction of insulating layer (II) not comprising material capable of occluding lithium | (5) Inorganic filler | — | Aluminum silicate | Barium sulfate | Aluminum silicate | Aluminum silicate |
| | Inorganic filler form | — | Tabular | Tabular | Block | Scaly |
| | (6) Resin C | PE, PP | Acrylic | Acrylic | Acrylic | Acrylic |
| | Weight ratio (5):(6) | — | 96:4 | 96:4 | 96:4 | 96:4 |
| Separator physical properties | Electrical resistivity of active layer ($\Omega$cm) | 100 | 100 | 100 | 100 | 100 |
| | Air permeability (s) of separator (layered state) | 310 | 150 | 140 | 150 | 140 |
| | Withstand voltage (kV) of separator (layered state) | 1.9 | 1.9 | 1.9 | 1.9 | 1.9 |
| | Average number of pores (/$\mu m^2$) of insulating layer (I) | 135 | 60 | 60 | 60 | 60 |
| | Mean pore size ($\mu$m) of insulating layer (I) | 0.05 | 0.1 | 0.1 | 0.1 | 0.1 |

TABLE 14-continued

|  |  | Example 54 | Example 55 | Example 56 | Example 57 | Example 58 |
|---|---|---|---|---|---|---|
| Thicknesses (μm) | A. layer | 5 | 5 | 5 | 5 | 5 |
|  | B. layer | 10 | 10 | 10 | 10 | 10 |
|  | C. layer | 10 | 5 | 5 | 5 | 5 |
|  | A. layer thickness % | 20 | 25 | 25 | 25 | 25 |
| Basic battery properties | Initial discharge capacity | S | S | S | S | S |
|  | Cycle characteristic | S | S | S | S | S |
| Battery safety | Dendrite short circuiting test (A) | S | S | S | S | S |
|  | Nail penetration test (A) | S | S | S | S | S |
|  | Nail penetration test (B) | S | S | S | S | S |

TABLE 15

|  |  | Comp. Example 18 | Comp. Example 19 | Comp. Example 20 | Comp. Example 21 |
|---|---|---|---|---|---|
| Number of layers |  | 2-layered | 2-layered | Single layer | 2-layered |
| A. Construction of layer comprising material capable of occluding lithium (active layer) | (1) Material (A) capable of occluding lithium | Graphite | Graphite | — | Graphite |
|  | Form of material capable of occluding lithium | Flaky | Flaky | — | Flaky |
|  | (2) Insulating particles | — | — | — | — |
|  | Form of insulating particles | — | — | — | — |
|  | (3) Resin A | Acrylic | Acrylic | — | PVDF |
|  | Weight ratio (1):(2):(3) | 90:0:10 | 90:0:10 | — | 1:0:5 |
| B. Construction of insulating layer (I) not comprising material capable of occluding lithium | (3) Inorganic filler | — | — | — | — |
|  | (4) Resin B | PE, PP | PE, PP | PE, PP | PE, PP |
|  | Weight ratio (3):(4) | — | — | — | — |
| C. Construction of insulating layer (II) not comprising material capable of occluding lithium | (5) Inorganic filler | — | — | — | — |
|  | Inorganic filler form | — | — | — | — |
|  | (6) Resin C | — | — | — | — |
|  | Weight ratio (5):(6) | — | — | — | — |
| Separator physical properties | Electrical resistivity of active layer (Ωcm) | 0.1 | 0.1 | — | 100,000 |
|  | Air permeability (s) of separator (layered state) | 200 | 200 | 150 | 300 |
|  | Withstand voltage (kV) of separator (layered state) | 0.7 | 0.7 | 1.2 | 1.6 |
|  | Average number of pores (/μm$^2$) of insulating layer (I) | 60 | 60 | 60 | 60 |
|  | Mean pore size (μm) of insulating layer (I) | 0.1 | 0.1 | 0.1 | 0.1 |
| Thicknesses (μm) | A. layer | 5 | 5 | — | 10 |
|  | B. layer | 10 | 10 | 10 | 10 |
|  | C. layer | — | — | — | — |
|  | A. layer thickness % | 33 | 33 | 100 | 50 |
| Basic battery properties | Initial discharge capacity | A | A | S | A |
|  | Cycle characteristic | A | S | A | A |
| Battery safety | Dendrite short circuiting test (A) | C | C | D | B |
|  | Nail penetration test (A) | B | B | B | A |
|  | Nail penetration test (B) | B | B | B | B |

|  |  | Comp. Example 22 | Comp. Example 23 | Comp. Example 24 |
|---|---|---|---|---|
| Number of layers |  | 3-Layered | 3-Layered | 3-Layered |
| A. Construction of layer comprising material capable of occluding lithium (active layer) | (1) Material (A) capable of occluding lithium | Graphite | Titania | Graphite |
|  | Form of material capable of occluding lithium | Flaky | Spherical | Flaky |
|  | (2) Insulating particles | — | — | Aluminum hydroxide oxide |
|  | Form of insulating particles | — | — | Tabular |
|  | (3) Resin A | PVDF | Acrylic | Acrylic |
|  | Weight ratio (1):(2):(3) | 1:0:5 | 98:0:1 (:CMC 1) | 70:20:10 |
| B. Construction of insulating layer (I) not comprising material capable of occluding lithium | (3) Inorganic filler | — | None | — |
|  | (4) Resin B | PE, PP | PE, PP | PE, PP |
|  | Weight ratio (3):(4) | — | — | — |

TABLE 15-continued

| | | | | |
|---|---|---|---|---|
| C. Construction of insulating layer (II) not comprising material capable of occluding lithium | (5) Inorganic filler | — | Alumina | — |
| | Inorganic filler form | — | Spherical | — |
| | (6) Resin C | PE, PP | Acrylic | PE, PP |
| | Weight ratio (5):(6) | — | 98:1 (:CMC 1) | — |
| Separator physical properties | Electrical resistivity of active layer (Ωcm) | 100,000 | 100,000,000 | 5 |
| | Air permeability (s) of separator (layered state) | 460 | 200 | 340 |
| | Withstand voltage (kV) of separator (layered state) | 2.6 | 1.7 | 2 |
| | Average number of pores (/μm$^2$) of insulating layer (I) | 60 | 60 | 60 |
| | Mean pore size (μm) of insulating layer (I) | 0.1 | 0.1 | 0.1 |
| Thicknesses (μm) | A. layer | 10 | 5 | 5 |
| | B. layer | 10 | 10 | 10 |
| | C. layer | 10 | 5 | 10 |
| | A. layer thickness % | 33 | 25 | 20 |
| Basic battery properties | Initial discharge capacity | A | S | S |
| | Cycle characteristic | B | A | A |
| Battery safety | Dendrite short circuiting test (A) | A | B | S |
| | Nail penetration test (A) | A | A | A |
| | Nail penetration test (B) | A | A | B |

The invention claimed is:

1. A separator for an electricity storage device comprising an active material having a conducting material (B), and a material (A) able to occlude lithium (Li),
wherein the separator for an electricity storage device has an air permeability of 650 s/100 ml or lower,
the active layer comprises the material (A) that is able to occlude lithium, and the conducting material (B),
the material (A) has a mean particle diameter at least 1.1 times and no greater than 500 times a mean particle diameter of the conducting material (B), and
the conducting material (B) comprises a conductive substance having an electrical resistivity of no higher than 0.1 Ωcm.

2. The separator according to claim 1, wherein the mean particle diameter of the material (A) is 1 μm or larger and 30 μm or smaller, and the mean particle diameter of the conducting material (B) is 0.005 μm or larger and smaller than 1 μm.

3. The separator according to claim 2, wherein the separator has at least one insulating layer, with the active layer being provided on the insulating layer.

4. The separator according to claim 3, wherein the at least one insulating layer comprises a first insulating layer and a second insulating layer, with the active layer being sandwiched between the first insulating layer and the second insulating layer.

5. The separator according to claim 4, wherein the first insulating layer and the second insulating layer comprise one or more selected from the group consisting of polyolefins, polyphenylene ethers, polysulfones, polyethersulfones, polyphenylene sulfides, polyetherimides, polyamideimides, polyamides, polyesters and inorganic particles.

6. The separator for an electricity storage device according to claim 4, wherein an average number of pores in either or both of the first and second insulating layers is 10/μm$^2$ or greater.

7. The separator according to claim 4, wherein an average number of pores in either or both of the first and second insulating layers is no greater than 200/μm$^2$.

8. The separator according to claim 4, 6 or 7, wherein the first insulating layer or the second insulating layer comprises a polyolefin resin, the polyolefin resin content in the first insulating layer or second insulating layer being 30 weight % or greater and 100 weight % or less.

9. The separator according to claim 8, wherein a mean pore size of either or both of the first and second insulating layers is 0.03 to 0.15 μm.

10. The separator according to claim 9, wherein either or both of the first and second insulating layers comprise inorganic particles, and the inorganic particles have one or more shapes selected from the group consisting of scaly tabular and block shapes.

11. The separator according to claim 10, wherein the material (A) able to occlude lithium is flaky, scaly, tabular, block-shaped or spherical.

12. The separator according to claim 11, wherein a voltage value during short circuiting in a withstand voltage measurement test is 0.3 to 4.5 kV.

13. An electricity storage device comprising a positive electrode, the separator according to claim 12, a negative electrode, and a lithium (Li)-conducting medium, wherein the Li-conducting medium is in liquid form, gel form or solid form.

14. The electricity storage device according to claim 13, wherein a potential (vsLi$^+$/Li) of the negative electrode during charge is lower than that of the material (A) able to occlude lithium (Li).

15. The electricity storage device according to claim 13, which is a lithium battery or a lithium ion secondary battery.

* * * * *